United States Patent [19]
Tsukamoto et al.

[11] Patent Number: 6,135,912
[45] Date of Patent: Oct. 24, 2000

[54] AUTOMATIC TRANSMISSION FOR A VEHICLE

[75] Inventors: Kazumasa Tsukamoto; Masahiro Hayabuchi; Satoru Kasuya; Masaaki Nishida; Kenji Gotou; Tomochika Inagaki; Hiroshi Kato, all of Anjo, Japan

[73] Assignee: Aisin AW Co., Ltd., Anjo, Japan

[21] Appl. No.: 09/325,396

[22] Filed: Jun. 4, 1999

[30] Foreign Application Priority Data

| Sep. 1, 1998 | [JP] | Japan | ................................. | 10-262313 |
| Sep. 30, 1998 | [JP] | Japan | ................................. | 10-294468 |
| Oct. 30, 1998 | [JP] | Japan | ................................. | 10-325983 |
| May 14, 1999 | [JP] | Japan | ................................. | 11-135031 |

[51] Int. Cl.$^7$ ...................................................... F16H 3/62
[52] U.S. Cl. ........................ 475/271; 475/285; 74/606 R
[58] Field of Search ................................... 475/285, 271; 74/606 R

[56] References Cited

U.S. PATENT DOCUMENTS 4,347,765  9/1982  Leonard et al. .
5,106,352  4/1992  Lepelletier .
5,495,778  3/1996  Mochizuki .

Primary Examiner—Dirk Wright
Attorney, Agent, or Firm—Oliff & Berridge, PLC

[57] ABSTRACT

An automatic transmission, which establishes automatic shifts in a multiple gear stages by selectively inputting a plurality of input rotations to a planetary gear set, includes first and third clutches connected through a reduction planetary gear to an input shaft and transmits a decelerated rotation to the planetary gear set and a second clutch directly connected to the input shaft and transmits a non-decelerated rotation to the planetary gear set. The reduction planetary gear is arranged on the end of a boss portion of a transmission case wall and the one element is fixed to the end of the boss portion, hydraulic servos of the first and third clutches are arranged on the boss portion, a hydraulic servo of a second clutch is arranged in the other side of the reduction planetary gear from the hydraulic servos, and the hydraulic paths for the hydraulic servos are formed in the boss portion.

20 Claims, 24 Drawing Sheets

|   | C-1 | C-2 | C-3 | B-1 | B-2 | B-3 | F-1 | F-2 | Gear Ratio | Step |
|---|---|---|---|---|---|---|---|---|---|---|
| P |   |   |   |   |   |   |   |   |   |   |
| R |   |   | O |   |   | O |   |   | 3.394 |   |
| N |   |   |   |   |   |   |   |   |   |   |
| 1st | O |   |   | △ |   |   |   | O | 4.148 | 1.75 |
| 2nd | O |   |   |   | O |   |   |   | 2.370 | 1.52 |
| 3rd | O |   | O |   | ● |   | O |   | 1.556 | 1.35 |
| 4th | O | O |   |   | ● |   |   |   | 1.155 | 1.34 |
| 5th |   | O | O |   | ● |   |   |   | 0.859 | 1.25 |
| 6th |   | O |   | O | ● |   |   |   | 0.686 |   |

FIG. 2

FIG. 8
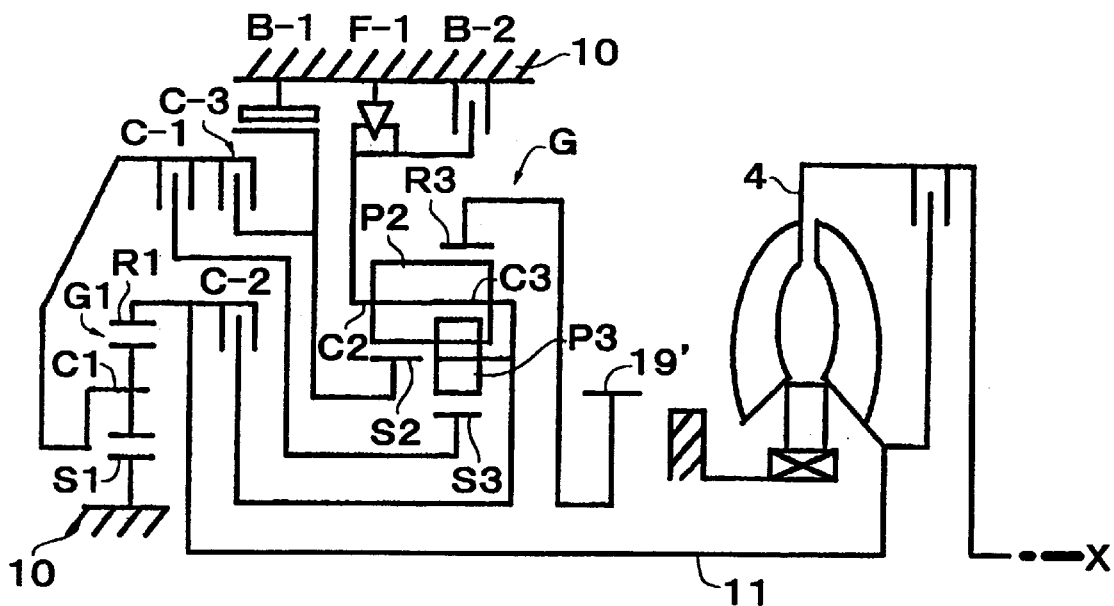
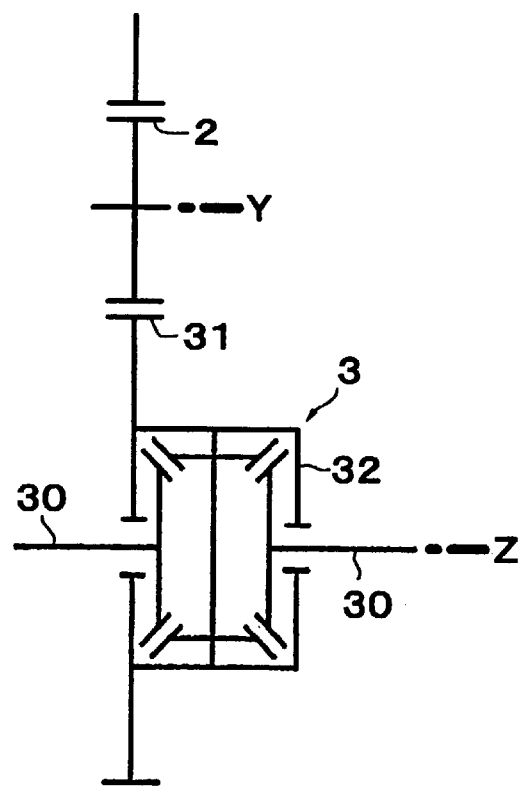

FIG. 10

|   | C-1 | C-2 | C-3 | B-1 | B-2 | F-1 | Gear Ratio | Step |
|---|---|---|---|---|---|---|---|---|
| P |   |   |   |   |   |   |   |   |
| REV |   |   | O |   | O |   | 3.389 |   |
| N |   |   |   |   |   |   |   |   |
| 1ST | O |   |   |   | (O) | O | 4.067 | ) 1.73 |
| 2ND | O |   |   | O |   |   | 2.354 | ) 1.51 |
| 3RD | O |   | O |   |   |   | 1.564 | ) 1.35 |
| 4TH | O | O |   |   |   |   | 1.161 | ) 1.35 |
| 5TH |   | O | O |   |   |   | 0.857 | ) 1.25 |
| 6TH |   | O |   | O |   |   | 0.684 |   |

AUTOMATIC TRANSMISSION FOR A VEHICLE

BACKGROUND OF THE INVENTION

1. Field of Invention

The invention relates to an automatic transmission for a vehicle. More specifically, it relates to a servo pressure application to each clutch in the gear train.

2. Description of Related Art

An automatic transmission, for which a power source is, for example, an engine and which used for driving, is required to multiply the gear ratios for an improvement in energy conservation. The energy conservation is improved by an efficient power transmission corresponding to a load. According to the requirement to conserve energy, the transmission mechanism of the automatic transmission for a vehicle has gone from a mechanism having forward four gear stages to a mechanism having forward five gear stages. For achieving a further increase in the gear stages in the limited mounting space on a vehicle, a reduction in the number of elements of the gear train and a simplification of the mechanism are needed. A gear train, which achieves six forward speeds and one reverse speed with a planetary gear set having minimum shift elements, three clutches and two brakes operating the planetary gear set, is suggested in U.S. Pat. No. 5,106,352. In this gear train, six forward speeds are established by two kinds of input rotations having different speeds, which are an engine output rotation, that is, a turbine output rotation of a torque converter and a decelerated rotation decelerated from that, are properly inputted to the planetary gear set having four shift elements of the shift mechanism by using three clutches and two shift elements are engaged with a transmission case by two brakes.

In the aforementioned gear train, the number of shift elements for establishing gear stages and the number of required clutches and brakes are reasonable. Generally, seal rings are arranged in a hydraulic path, for applying a hydraulic pressure to the clutches and the brakes, for sealing at a position at which members relatively rotate. The seal ring provides a seal effect by being pressed. Therefore, relatively large sliding resistance occurs between the members which relatively rotate with respect to each other. Therefore, if the number of seal rings increases, the rotational resistance of corresponding rotational members increases and power loss increases. Further, grooves, in which seal rings are arranged, need high accuracy because the oil is sealed by contacting seal rings and grooves. Additionally, wear can occur in portions relatively sliding with seal rings by the relative rotation to the seal rings. Therefore, such portions need improvement, such as a hardening to prevent wear. Therefore, if the number of seal ring grooves increases, man hours for manufacture and manufacturing cost increase producing a product cost increase. Thus, it is desirable to decrease the number of seal portions.

In the aforementioned gear train in the related art, there are two input side power transmission routes in which an output from the torque converter is inputted as it is to the planetary gear set in one side, the output from the torque converter is decelerated at a reduction planetary gear and the decelerated rotation is inputted to the planetary gear set. Therefore, there may be a need for many seal rings corresponding to an arrangement of the hydraulic servo of each clutch, which changes the power transmission route for shifting, because the connecting arrangement for the hydraulic paths, for applying hydraulic pressures, from the transmission case to the hydraulic servos is complicated and the hydraulic paths traverse many times between members relatively rotated with respect to each other.

Generally, a hydraulic pressure is applied to the hydraulic servo of the each clutch from a front end wall portion and a rear end wall portion of the transmission case. The hydraulic path structure is simplified by arranging a center support on the middle portion of the transmission case and applying hydraulic pressure from the center support. In this case, the number of seal rings is reduced. However, in such a case, the center support is arranged in the shift mechanism. Therefore, the axial size of the transmission is increased. Further, the number of parts is increased and costs increase. Therefore, it is desirable to simplify the hydraulic path structure. Especially, the aforementioned gear train in the related art would have a multiple shaft structure because there are two kinds of inputs having different rotational speeds. Therefore, it is difficult to greatly reduce the number of seal rings even if the center support is provided.

SUMMARY OF THE INVENTION

In view of the above problems associated with the related art, an object of the invention is to provide an automatic transmission for a vehicle in which the number of seal rings, which incur a power loss in the aforementioned gear train, is minimized and power transmission efficiency is improved by structuring the shape of the transmission case and arranging the hydraulic servos of clutches.

To achieve the aforementioned object, the invention, an automatic transmission for a vehicle automatically establishes multiple gear ratios by selectively inputting a plurality of input rotations to a planetary gear set, and comprises a first clutch and a third clutch, which are connected through a reduction planetary gear to an input shaft and which input a decelerated rotation to the planetary gear set, and a second clutch which is directly connected to the input shaft and which inputs a non-decelerated rotation to the planetary gear set, wherein one element of the reduction planetary gear is arranged and fixed on the end of a boss portion extended from a case wall of the transmission, the hydraulic servos of the first clutch and the third clutch are arranged on the boss portion, the hydraulic servo of the second clutch is arranged on the opposite side of the reduction planetary gear from the hydraulic servos of the first and third clutches, and hydraulic paths for applying hydraulic pressures to the hydraulic servos of the first and third clutches are formed in the boss portion.

As one structure for arrangement of the hydraulic servos of the clutches, it is effective that the hydraulic servo of the first clutch is closer to the reduction planetary gear than the hydraulic servo of the third clutch, the clutch drum of the first clutch is connected to an output element of the reduction planetary gear, the hub of the third clutch is connected through the clutch drum of the first clutch to the output element of the reduction planetary gear, and the clutch drum of the third clutch is connected to a shift element of the planetary gear set.

As another structure for arrangement of the hydraulic servos of the clutches, it is effective that the hydraulic servo of the first clutch is closer to the reduction planetary gear than the hydraulic servo of the third clutch, the clutch drum of the first clutch is connected to an output element of the reduction planetary gear, and the clutch drum of the third clutch is connected through the clutch drum of the first clutch to the output element of the reduction planetary gear.

In another structure, it is effective that the cylinders of the hydraulic servos of the first and third clutches are common with each other, the hydraulic servos comprising a piston inserted in the inner side of the cylinder and the other piston covering the outer side, the hydraulic servos are arranged back to back so that the operational directions of the pistons are opposite with each other.

Further, in the another structures, it is effective that the hydraulic servos of the first and third clutches are arranged in order that the cylinders open to the reduction planetary gear, the radial inner surface of the clutch drum of the third clutch is connected to the clutch drum of the first clutch, and the hub of the third clutch is extended in the radial outer space of the first clutch and connected to one of the shift elements of the planetary gear set.

As a further structure of the arrangement of the hydraulic servos of the clutches, it is effective that the clutch drum of the second clutch is non-rotatably connected to the input shaft, and a hydraulic path for applying a hydraulic pressure to the hydraulic servo of the second clutch is connected to a hydraulic path formed in the other side case wall.

In the aforementioned structure, it is effective that an output shaft of the transmission is arranged in the rear end portion of the case on the same axis as the input shaft, and the hydraulic path for the hydraulic servo of the second clutch is connected through hydraulic paths formed in the input shaft and the output shaft to the hydraulic path formed in the rear end portion of the case.

In the aforementioned structure, it is effective that a hydraulic path for lubrication is formed in the input shaft, and the hydraulic path is connected to a hydraulic path formed in the boss portion containing the hydraulic paths for the first and third clutches.

In the aforementioned structure, it is effective that the hydraulic servo of the second clutch is arranged on the other boss portion extended from the other case wall, and the hydraulic path for the hydraulic servo of the second clutch is connected to a hydraulic path formed in the other boss portion.

In the aforementioned structure, it is effective that the hydraulic path for lubrication is connected to a hydraulic path formed in the other case wall.

Further, as a further structure for arrangement of the hydraulic servos of the clutches, it is possible to arrange the second clutch in a neighbor position to the reduction planetary gear, the clutch drum is relatively non-rotatably connected to the input shaft, and a hydraulic path to the hydraulic servo of the second clutch is connected as a hydraulic path formed in the input shaft to a hydraulic path formed in the boss portion.

In this case, it is effective that the clutch drum of the second clutch is in common with an input member inputting a rotation to the reduction planetary gear.

In the aforementioned structure, it is effective that the hydraulic path for lubrication formed in the input shaft is connected to a hydraulic path formed in a case wall which is arranged in the other side from the case wall extending the boss portion having the hydraulic paths for the first and third clutches.

Further, corresponding to arrangements of the hydraulic servos of the clutches, it is possible to structure such that the hydraulic path for the second clutch is connected to the hydraulic path formed in the case wall at the rear end portion of the input shaft, and a clearance between the input shaft and the case wall surrounding the input shaft is sealed with one seal ring.

As a specific structure for the gear train, it is effective that the planetary gear set comprises first through fourth shift elements, the first shift element is connected to the output side member of the first clutch, the second shift element is connected to an output side member of the third clutch and can to be engaged with the transmission case by a first engaging means, the third shift element is connected to the output side member of the second clutch and can be engaged with the transmission case by a second engaging means, and the fourth shift element is connected to an output member.

According to the various structures of the invention, the hydraulic servos of the first and third clutches are arranged on the boss portion extended from the case. Therefore, a pair of seal rings is needed for sealing individually in the application of the hydraulic pressures from the hydraulic paths formed in the boss portion to the hydraulic servos of the first and third clutches. As a result, the sliding resistance is largely reduced. Further, the hydraulic servo of the second clutch is arranged at the opposite side of the reduction planetary gear from the hydraulic servos of the first and third clutches. Therefore, no member transmitting the decelerated rotation is interposed in the application route of the hydraulic pressure to the hydraulic servo of the second clutch. As a result, an increase in the number of seal rings caused by the two kinds of input rotations is prevented. Thus, by these structures, the number of seal rings is reduced. Therefore, an improvement in the sealing face is produced and the manufacturing man hours and costs are reduced. Further, one element of the reduction planetary gear is always fixed to the boss portion extended from the case. Therefore, a particular support wall for fixing the one element is not needed. Further, the fixing portion is in common with the boss portion in which the hydraulic paths for applying the hydraulic pressures to the hydraulic servos of the first and third clutches are formed. As a result, the transmission structure in compact. A shift mechanism establishing six gear ratios is achieved that is able to achieve the aforementioned effects.

The decelerated rotation from the reduction planetary gear is transmitted to the clutch drum of the first clutch, which is arranged in a neighboring position to the reduction planetary gear, and the decelerated rotation is transmitted through the clutch drum of the first clutch to the hub which is an input side member of the third clutch. Therefore, a connecting member for transmitting the decelerated rotation is not needed to be arranged in the radial inner side of the first clutch. As a result, the hydraulic pressures are directly applied from the boss portion to the hydraulic servos so that the number of seal rings is reduced.

The decelerated rotation from the reduction planetary gear is transmitted to the clutch drum of the first clutch arranged in a neighboring position to the reduction planetary gear, and the decelerated rotation is transmitted through the clutch drum of the first clutch to the clutch drum as the input side member of the third clutch arranged in the far position from the reduction planetary gear. Therefore, a connecting member for transmitting the decelerated rotation need not be arranged in the radial inner side of the first clutch. As a result, the hydraulic pressures are directly applied from the boss portion to the hydraulic servos so that the number of seal rings is reduced.

Further, the members structuring the hydraulic servos of the first and third clutches are in common with each other. Therefore, the hydraulic servos of both clutches are compactly structured. As a result, the transmission is compact in addition to reducing the number of seal rings.

Further, the input rotation, which is decelerated in the reduction planetary gear, is always inputted to the clutch drum of the third clutch. Therefore, the input rotation can be detected with the radial outer surface clutch drum of the third clutch. In a connecting structure in which the input rotation is directly detected using the input shaft, a rotation sensor must be mounted in a deep position in the transmission. However, in the structure of the invention, a rotation sensor need not be buried deeply in the transmission. As a result, the transmission has a compact structure.

Further, the hydraulic path for the hydraulic servo of the second clutch is formed in the case wall which is different from the case wall having the hydraulic paths for the hydraulic servos of the first and third clutches. Therefore, the hydraulic paths are divided so that a complication in the hydraulic paths is prevented. Especially, in the case where the hydraulic paths for the hydraulic servos of the first and third clutches are formed in the case wall structured from the oil pump body, the aforementioned hydraulic paths and hydraulic paths for connecting the oil pump and the valve body are further complicated. However, in the structure of the invention, the hydraulic paths are properly deployed by forming the hydraulic path for the hydraulic servo of the second clutch in the other case wall.

Further, the hydraulic pressure is applied to the hydraulic servo of the second clutch from the case rear end wall. Therefore, it is prevented that the hydraulic paths are centered in the case front end wall ordinary structured from the oil pump body.

Further, the hydraulic path for lubrication is formed in the boss portion, and the lubrication oil is applied from the boss portion directly faced to the input shaft. Therefore, the number of seal rings for sealing the lubrication hydraulic path is reduced. As a whole, a number of seal rings needed is reduced.

Further, the hydraulic pressure is applied to the hydraulic servo of the second clutch without passing through the input shaft. Therefore, only a pair of seal rings is needed for sealing the hydraulic path for the hydraulic servo of the second clutch. Further, the boss portion is used for supporting the input shaft and for applying the hydraulic pressure so that members are common. As a result, the axial size of the transmission is reduced.

Further, the hydraulic paths for the hydraulic servos of the first and third clutches are formed in the case wall, and the hydraulic path for the hydraulic servo of the second clutch and the hydraulic path for lubrication oil are formed in the other case wall. Therefore, the hydraulic paths formed in the case walls are deployed and the number of seal rings is reduced. The hydraulic path for the hydraulic servo of the second clutch is sealed with a pair of seal rings.

Further, the input member for inputting the rotation to the reduction planetary gear is common with the clutch drum of the second clutch so that the transmission is compactly structured.

Further, the hydraulic pressure is applied to the lubrication hydraulic path from the case wall which is arranged on the other side from the boss portion having the hydraulic paths for hydraulic servos of the three clutches. Therefore, it is prevented to center the hydraulic paths in the boss portion.

Further, the number of seal rings for sealing the hydraulic path for the hydraulic servo of each clutch and for sealing the lubrication hydraulic path is minimized.

BRIEF DESCRIPTION OF THE DRAWINGS

The invention will be described in conjunction with the following drawings in which like features are designated with like reference characters, and wherein:

FIG. 2 is a table showing the operation of the gear train, the established gear ratios and the gear ratio steps in the first embodiment;

FIG. 8 is a schematic diagram illustrating the structure of the fourth embodiment in which the invention is applied to a transverse type transaxle;

FIG. 10 is a table showing the operation of the gear train, the established gear ratios and the gear ratio steps in the fourth embodiment;

DETAILED DESCRIPTION OF PREFERRED EMBODIMENTS

Figure 1:
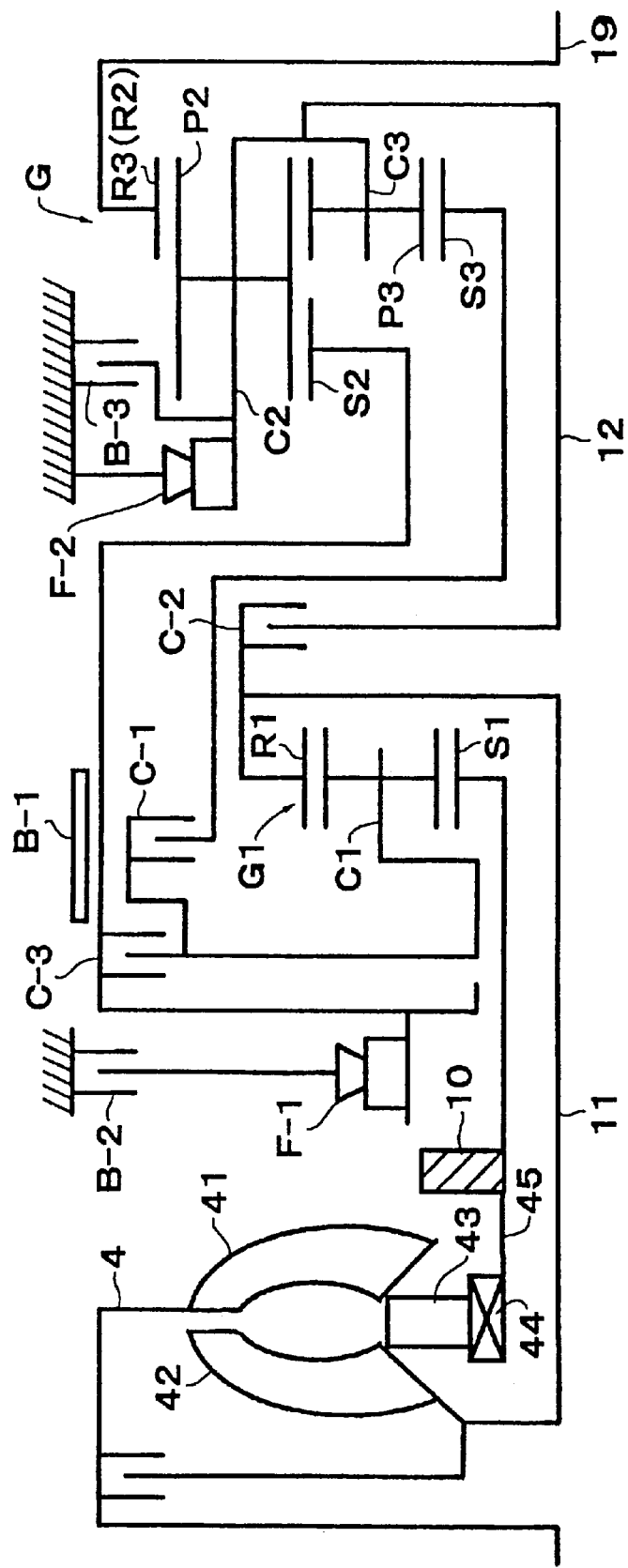
FIG. 1 is a schematic diagram illustrating the structure of the first embodiment of an automatic transmission of the invention.

The invention will become more apparent from a detailed description of preferred embodiments with reference to the accompanying drawings. FIGS. 1 through 4 illustrate the first embodiment in which the invention is applied to an automatic transmission for a front engine/rear wheel drive (FR) vehicle. The entire structure is illustrated in a schematic diagram in FIG. 1. The transmission establishes automatic gear shifts in multiple gear stages by selectively inputting a plurality of input rotations to a planetary gear set.

In the automatic transmission, a torque converter 4, which is connected to an engine (not shown), having a lock-up clutch is arranged in the mostly front portion of the mechanism. The shift mechanism, establishing six forward speeds and one reverse speed, is arranged in the rear side of the torque converter 4 and in a transmission case 10. The shift mechanism comprises an input shaft 11, the planetary gear set G having four shift elements S2, S3, C2 (C3), R3, a reduction planetary gear G1, three clutches C-1, C-2, C-3 for inputting a decelerated rotation and a non-decelerated rotation to the planetary gear set G, and two engaging means B-1, F-1, B-2 and B-3, F-2 for stopping the shift elements from rotating.

The gear train of the embodiment will be described in further detail. The torque converter 4 comprises a pump impeller 41, a turbine runner 42, a stator 43 arranged between them, a one-way clutch 44 engaging the stator 43 with the transmission case 10 in the one-way direction, and a stator shaft 45 fixing the inner race of the one-way clutch to the transmission case 10.

The planetary gear set G, structuring the main part of the shift mechanism, is ravegneaux type gear set comprising a pair of sun gears S2, S3, carrier C2 (C3) supporting a pair of pinions P2, P3, and a ring gear R3 (R2). The sun gears S2, S3 have different diameters which are large diameter and small diameter. The pinions P2, P3 are engaged with each other, one of the pinions is engaged with the large sun gear S2 and the ring gear R3 (R2), and the other pinion is engaged with the small sun gear S3. In this embodiment, the small sun gear S3, the large sun gear S2 and the carrier C2 (C3), as the first through third shift elements, are connected in order to the clutches C-1, C-2, C-3 as an input elements individually. The ring gear R3 (R2) as the fourth shift element is connected to an output shaft 19 as an output element. Specifically, the small sun gear S3 is connected through the first clutch C-1 and the reduction planetary gear G1 to the input shaft 11, the large sun gear S2 is connected through the third clutch C-3 and the reduction planetary gear G1 to the input shaft 11 and can be engaged with the transmission case 10 by a first engaging means B-1, F-1, B-2. The carrier C3 is connected through the second clutch C-2 to the input shaft 11 and can be engaged with the transmission case 10 by a second engaging means (B-3, F-2). The ring gear R3 is connected to the output shaft 19.

The reduction planetary gear G1 is structured from a simple planetary gear. A ring gear R1, as the input element, is connected to the input shaft 11; a carrier C1, as the output element, is connected through the first clutch C-1 to the first shift element, that is, the small sun gear S3 and connected through the third clutch C-3 to the second shift element, that is, the large sun gear S2, and a sun gear S1, as a stationary element, acting as a reaction element is fixed to the transmission case 10.

Figure 3:
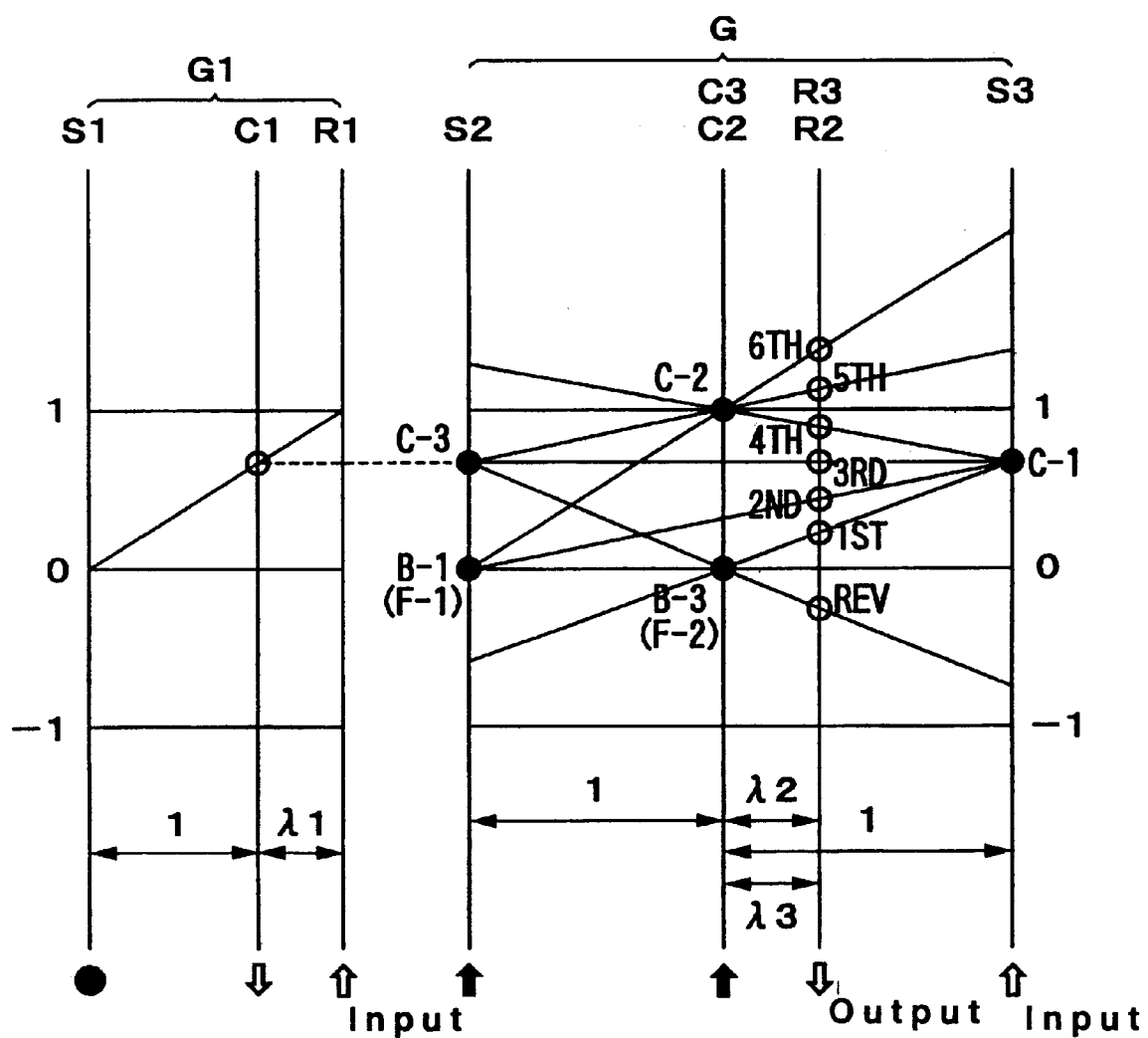
FIG. 3 is a velocity diagram for the gear train in the first embodiment.

The automatic transmission thus structured shifts according to a vehicle load within gear stages corresponding to a shift range selected by a driver by means of an electronic control system and a hydraulic control system which are not shown. FIG. 2 shows the gear stages, which are established by engagement and disengagement of each clutch and brake, with a table. In this table, a symbol ○ means engagement, a blank means disengagement, a symbol Δ means engagement which is performed only in case an engine brake is established, and a symbol ● means engagement which is not directly operated for establishing the gear stages. FIG. 3 shows the gear stages, which are established by engagement and disengagement of each clutch and brake, and a relationship with the rotational ratio of each shift element in each gear stage with a velocity diagram. In this diagram, a symbol ● means engagement.

As shown in both figures, a first speed (1ST) is established by engagement of the clutch C-1 and the brake B-3. It should be noted that, in this embodiment, as shown in the operational table, the automatic engagement of the one-way clutch F-2 is used instead of engagement of the brake B-3, and the third brake B-3 is engaged in an engine brake state. The reason for using this engagement and the reason that this engagement is equivalent to engagement of the brake B-3 will be described later. In this case, the decelerated rotation, which is decelerated from the rotation of the input shaft 11 shown in FIG. 1 through the reduction planetary gear G1, is inputted to the small sun gear S3 through the clutch C-1. The carrier C3, which is engaged with the case 10 by engagement of the one-way clutch F-2, acts as a reaction element, and the decelerated rotation of the ring gear R3 (R2) having the largest reduction ratio is outputted to the output shaft 19.

Next, a second speed (2ND) is established by engagement of the clutch C-1 and the engagements of the one-way clutch F-1 and the brake B-2, which is engaged for validating the engagement of the one-way clutch F-1, which are equivalent to engagement of the brake B-1. It should be noted that the reason that the engagements of the one-way clutch F-1 and the brake B-2 are equivalent to the engagement of the brake B-1 will be mentioned later. In this case, the decelerated rotation, which is decelerated from the rotation of the input shaft 11 through the reduction planetary gear G1, is inputted to the small sun gear S3 through the clutch C-1. The large sun gear S2, which is engaged with the case 10 by the engagements of the brake B-2 and the one-way clutch F-1, acts as a reaction element, and the decelerated rotation of the ring gear R3 (R2) is outputted to the output shaft 19. The reduction ratio in this case is less than the reduction ratio in the first speed (1ST) as shown in FIG. 3.

Further, a third speed (3RD) is established by the concurrent engagement of the clutch C-1 and the clutch C-3. In this case, the decelerated rotation, which is decelerated from the rotation of the input shaft 11 through the reduction planetary gear G1, is concurrently inputted to the large sun gear S2 and the small sun gear S3 through the clutch C-1 and the clutch C-3 individually so that the planetary gear set G is in the directly connected state. The rotation of the ring gear R3 (R2), which is the same as the input rotation inputted to both sun gears S2, S3, is outputted to the output shaft 19 as the rotation decelerated from the rotation of the input shaft 11.

Further, a fourth speed (4TH) is established by concurrently engaging the clutch C-1 and the clutch C-2. In this case, the decelerated rotation, which is decelerated from the rotation of the input shaft 11 through the reduction planetary gear G1, is inputted to the small sun gear S3 through the clutch C-1 on one side. The rotation, which is not decelerated and inputted from the input shaft 11 through the clutch C-2, is inputted through an intermediate shaft 12 to the carrier C3 on the other side, and the middle rotation between the two input rotations, which is the rotation of the ring gear R3 (R2) barely decelerated from the rotation 7 of the input shaft 11, is outputted to the output shaft 19.

Next a fifth speed (5TH) is established by concurrent engagements of the clutch C-2 and the clutch C-3. In this case, the decelerated rotation, which is decelerated from the rotation of the input shaft 11 through the reduction planetary gear G1, is inputted to the small sun gear S2 through the clutch C-3 on one side. The non-decelerated rotation, which is not decelerated and inputted from the input shaft 11 through the clutch C-2, is inputted through the intermediate shaft 12 to the carrier C2 on the other side, and the rotation, which is barely accelerated from the rotation of the input shaft 11, of the ring gear R3 (R2) is outputted to the output shaft 19.

A sixth speed (6TH) is established by engagement of the clutch C-2 and the brake B-1. In this case, the non-decelerated rotation from the input shaft 11, which is not reduced, is inputted to only the carrier C2 through the clutch C-2. The sun gear S2, which is engaged with the case 10 by the engagement of the brake B-1, acts as a reaction element, and the rotation of the ring gear R3 (R2), which is further accelerated, is outputted to the output shaft 19.

A reverse speed (REV) is established by the engagements of the clutch C-3 and the brake B-3. In this case, the decelerated rotation, which is decelerated from the rotation of the input shaft 11 through the reduction planetary gear G1, is inputted to the sun gear S2 through the clutch C-3. The carrier C2, which is engaged with the case 10 by engagement of the brake B-3, acts as a reaction element, and the rotation of the ring gear R3 (R2), which is a reverse rotation, is outputted to the output shaft 19.

Here, the relationship between the one-way clutch F-2 and the brake B-3 and the relationship between the one-way clutch F-1 and brakes B-1, B-2 mentioned above will be described. As shown in the relationship of engagement/disengagement of brakes B-1, B-2 in the first speed and the second speed, one of the brakes is disengaged and the other brake is engaged concurrently, or simultaneously, in the up/down shift between these gear stages. That is, the brakes are frictional engagement elements which change states with respect to one another. In changing the states of the frictional engagement elements, a precise concurrent control for the engagement pressure and the disengagement pressure of the hydraulic servos which control the brakes is needed. To perform the control, additional control valves and a complication of the hydraulic circuit are required. In this embodiment, the engagement direction of the one-way clutch F-2 is set to be same as the supporting direction for the reaction torque in the first speed. Thus, the one-way clutch F-2 is substantially operated to provide the same function as the engagement of the brake B-3, by using that the reaction torque received by the carrier C2 (C3), is reversed between the first speed and the second speed. That is, in the first speed, the carrier C2 (C3) is engaged by the one-way clutch F-2 instead of the brake B-3. It should be noted that, in an engine coasting state in which the wheels drive the engine, the engagement of the brake B-3 is needed, as shown with the symbol Δ in FIG. 2, for achieving an engine brake because the direction of the reaction force received by the carrier C2 (C3) is reversed from the case of an engine drive state. Therefore, it is possible to structure the transmission so that the first speed is established by engagement of the brake B-3 without requiring the one-way clutch for establishing the gear stage.

The same relationship with the aforementioned relationship is established in the case of the sun gear S2. In this case, the engagement direction of the one-way clutch F-1 is set as the same direction in which the sun gear S2 supports the reaction torque in the second speed so that the one-way clutch F-1 performs substantially an equivalent function with the engagement of the brake B-1. The function of the sun gear S2 is different from the function of the carrier C2 (C3). That is, the sun gear S2 is engaged with the case 10 for achieving the engine brake in the second speed and for establishing the sixth speed. Therefore, the brake B-1 is needed. Further, as shown in the velocity diagram in FIG. 3, the sun gear S2 rotates in the reverse direction from the direction of the input rotation in the first speed, but rotates in same direction with the direction of the input rotation in the gear stages higher than the third speed. Therefore, the one-way clutch F-1 is not able to be directly connected to a stationary member. Therefore, the one-way clutch F-1 and the brake B-2 are arranged in series so that the engagement state of the one-way clutch F-1 is effectively operated.

As shown with the clearance in the up/down direction between symbols ○ which show the speed ratios of the ring gear R3, R2 on the velocity diagram in FIG. 3, each gear stage thus established has a proper speed step having a relatively equal interval between each gear stage. This relationship is shown with gear ratios and steps between gear ratios in FIG. 2 by specifically providing the setting values and quantitatively showing. The gear ratio in this case is a value where a teeth number ratio $\lambda 1$ between the sun gear S1 and the ring gear R1 of the reduction planetary gear G1 equals 0.556, a teeth number ratio $\lambda 2$ between the sun gear S2 and the ring gear R2 (R3) of the planetary gear set G equals 0.458, and a teeth number ratio $\lambda 3$ between the sun gear S3 and the ring gear R3 equals 0.375, the width of the gear ratios is equal to 6.049.

Next, the specific arrangement of the each element structuring the shift mechanism of the automatic transmission will be described in further detail with reference to FIG. 4 which simply illustrates a cross sectional view for easy reference. It should be noted that, throughout the specification, the term clutch is a generic name of a frictional member structured from wet, multiple discs, a clutch drum and a hub which are an input/output member and a support member, and a hydraulic servo which is slotted in the cylinder supported in or integrally connected to the drum. Further, as to the term brake, in case the brake is structured from wet, multiple discs the same as a clutch, the term brake is a generic name of a frictional member, a hub as an input member and a support member, the case portion as a reaction member, and a hydraulic servo which is slotted in the cylinder supported in or integrally connected to the drum. In case where the brake is a band brake, the term brake is a generic name of a band itself, a drum engaged by the band, and a hydraulic servo as a band engaging means.

The transmission case 10 accommodating the shift mechanism comprises a front end wall 10*f* ordinarily formed by an oil pump body and a cover in the front end and a cylindrical boss portion 10*a* extending to the interior of the transmission from the front end wall 10*f*. The sun gear S1, as one shift element of the reduction planetary gear G1, is fixed to the end of the cylindrical boss portion 10*a* and arranged on the cylindrical boss portion 10*a*. Hydraulic servos 6, 7 of the first clutch C-1 and the third clutch C-3 are arranged on the front side portion, which is the front side of the reduction planetary gear G1, of the cylindrical boss portion 10*a* so that hydraulic pressures are applied from hydraulic paths formed in the boss portion 10*a*. A hydraulic servo 5 of the second clutch C-2 is arranged at the opposite side of the reduction planetary gear G1 from the hydraulic servos 6, 7 of the first and third clutches C-1, C-3 and supported on the input shaft 11 at the rear side of the reduction planetary gear G1. Three hydraulic paths L1 through L3 are formed in the cylindrical boss portion 10*a*. Two hydraulic paths L1, L3 are respectively connected to the hydraulic servos 6, 7 of the first clutch C-1 and the third clutch C-3. The remaining hydraulic path L2 is connected through the inside of the input shaft 11 to the hydraulic servo 5 of the second clutch C-2.

The upstream sides, or front sides, of the hydraulic paths L1 through L3 formed in the cylindrical boss portion 10a are individually connected through the front end wall 10f structured from the oil pump body to a valve body (not shown in the figures). The downstream side of the third hydraulic path L3 is connected through a radially extending hydraulic path positioned in the mostly front portion of the cylindrical boss portion 10a and a perimeter direction hydraulic path structured from a groove on the periphery of the boss portion 10a to the cylinder 70 of the hydraulic servo 7 of the third clutch C-3. Further, the downstream side of the first hydraulic path L1 is connected through a radially extending hydraulic path positioned in the intermediate portion of the cylindrical boss portion 10a and a perimeter direction hydraulic path structured from a groove on the periphery of the boss portion 10a to the cylinder 60 of the hydraulic servo 6 of the first clutch C-1. Further, the downstream side of the second hydraulic path L2 is opened through a radially extending hydraulic path positioned in the rear portion of the cylindrical boss portion 10a to the radially inner side of the cylindrical boss portion 10a.

Next, the front end portion of the input shaft 11 is connected to the turbine runner 42 of the torque converter 4, shown in FIG. 1, and extends from the front end wall 10f of the transmission case 10 past the end of the cylindrical boss portion 10a. The front end side of the input shaft 11 is supported through a roller bearing by the front end wall 10f, and the rear end side of the input shaft 11 is supported through a roller bearing by the inner surface of the end of the cylindrical boss portion 10a. The input portion to the reduction planetary gear G1 is a flange extending from input shaft 11 and connected to the ring gear R1 as the input element for the reduction planetary gear G1. A shaft hole is formed in the rear end of the input shaft 11. The shaft hole is a support portion for the intermediate shaft 12. A shaft hydraulic path 11a is formed in the input shaft 11. The front portion of the shaft hydraulic path 11a is opened through a radially extending hydraulic path to the outer side of the input shaft 11 at a perimeter direction hydraulic path structured from a periphery groove in the input shaft 11. The periphery groove is faced to the opening of the radial hydraulic path of the second hydraulic path L2 formed in the cylindrical boss portion 10a. Further, the shaft hydraulic path 11a of the input shaft 11 is connected through a generally radially extending hydraulic path formed in the rear end of the input shaft 11 to the cylinder 50 of the hydraulic servo 5 of the second clutch C-2.

The front end portion of the output shaft 19 is rotatably supported through a roller bearing by the rear end wall portion 10r of the transmission case, and the rear end portion is rotatably supported through a ball bearing 19b by an extension housing fixed to the transmission case 10. The connecting portion, which is connected to the ring gear R3 as the output element of the planetary gear set G, of the output shaft 19 is a flange. The flange is connected through a drum member to the ring gear R3. A shaft hole, which has two diameters formed by increasing the diameter in two steps, is formed in the front end of the output shaft 19. The shaft hole is a seal portion with the intermediate shaft 12 and a support portion for the intermediate shaft 12.

The planetary gear set G is arranged between the rear end of the input shaft 11 and end portion is the front end of the output shaft 19 and supported on the intermediate shaft 12. Specifically, the carriers C2, C3, supporting the pinions P2, P3 of the planetary gear set G are integrated with each other.

The front end portion of the carriers C2, C3 is rotatably supported through a shaft bush on the shaft portion of the large sun gear S2, and the rear fixed to the flange of the intermediate shaft 12. The small sun gear S3 s rotatably supported through a shaft bush 13a on the intermediate shaft 12, and the large sun gear S2 is rotatably supported through a shaft bush 14b on the small sun gear S3. Thus, the small sun gear S3 is directly supported on the intermediate shaft 12, the large sun gear S2 is supported through the small sun gear S3 on the intermediate shaft 12, the front end of the carriers C2, C3 is supported through the large sun gear S2 and the small sun gear S3 on the intermediate shaft 12, and the rear end of the carrier C2, C3 is directly fixed to the intermediate shaft 12. That is, each element is in a center portion of the intermediate shaft 12. The ring gear R3 is connected with a spline engagement (not shown) to the drum member extended from the flange formed on the output shaft 19. The ring gear R3 is automatically aligned.

The reduction planetary gear G1 is arranged on the end of the boss portion cylindrical boss portion 10a. Specifically, the sun gear S1 is engaged with a spline engagement on the stator shaft 45 which is shown in FIG. 1 and inserted in and fixed on the inner surface of the cylindrical boss portion 10a of the transmission case 10. Such a structure is shown in U.S. Ser. No. 09/325,568, Atty Docket No. 103366, filed Jun. 4, 1999, the disclosure of which is incorporated by reference. The carrier C1 of the reduction planetary gear G1 is supported with a spline engagement on an inner side boss portion of the clutch drum 62 of the first clutch C-1 at one side. The ring gear R1 is connected to the clutch drum 52 of the second clutch C-2 and fixed to the flange formed on the input shaft 11.

The rear end portion of the hub 54 of the second clutch C-2 is connected to a front side flange formed on the intermediate shaft 12, the drum 52 is fixed to the flange formed on the input shaft 11 and supported on the rear end of the input shaft 11. The frictional member 53 of the clutch C-2 is structured from multiple frictional elements and separator plates. The separator plates are engaged with a spline engagement on the inner surface of the drum 52 and the inner portions of the frictional elements are engaged with a spline engagement on the outer surface of the hub 54, which is connected to the flange formed on the intermediate shaft 12. The frictional member 53 is thus arranged between the drum 52 and the hub 54. The hydraulic servo 5 of the clutch C-2 is supported by the drum 52. The hydraulic servo 5 comprises the cylinder 50 defined by the inner side of the drum 52 and the outer surface of the input shaft 11, a piston 51 is axially slidably inserted in the cylinder 50, a cancel plate is fixed on the input shaft 11, and a return spring is arranged between the piston 51 and the cancel plate. The hydraulic servo 5 is arranged at the rear side but adjacent to the reduction planetary gear G1.

The inner side boss portion of the drum 62 of the first clutch C-1 is rotatably supported on the cylindrical boss portion 10a, and the boss portion is connected to the carrier C1 of the reduction planetary gear G1. The frictional member 63 of the clutch C-1 is structured from multiple frictional elements and separator plates. The separator plates are engaged with a spline engagement on the inner surface of the drum 62 and the inner portions of the frictional elements are engaged with a spline engagement on the outer surface of the hub 64. The frictional member 63 is arranged between the drum 62 and the hub 64. The hub 64 is connected through a connecting member 13 having a drum shape to the sun gear S3. The hydraulic servo 6 of the clutch C-1 comprises the cylinder 60 defined by the inner side of the drum 62, a piston 61 is axially slidably inserted in the cylinder 60, a cancel plate is fixed on the inner side boss portion of the drum 62, and a return spring is arranged between the piston 61 and the cancel plate. In this arrangement, the frictional member 63 is arranged radially outwardly of the reduction planetary gear G1.

The inner side boss portion of the drum 72 of the third clutch C-3 is rotatably supported through a bearing 72a on the cylindrical boss portion 10a of the transmission case 10, and the outer portion of the drum 72 is connected through a connecting member 14 having a drum shape to the sun gear S2. The frictional member 73 of the clutch C-3 is structured from multiple frictional elements and separator plates. The separator plates are engaged with a spline engagement on the inner surface of the drum 72 and the inner portions of the frictional elements are engaged with a spline engagement on the outer surface of the hub 74 structured from the drum 62 of the first clutch. The frictional member 73 is arranged between the drum 72 and the hub 74. The hydraulic servo 7 of the clutch Cl3 comprises the cylinder 70 defined by the inner side of the drum 72, a piston 71 is axially slidably inserted into the cylinder 70, a cancel plate is fixed on the inner side boss portion of the drum 72, and a return spring is arranged between the piston 71 and the cancel plate.

The brake B-1 forming one of the first engaging means is a band brake comprising the clutch drum 72 of the third clutch C-3 as a brake drum and a band 81 for engaging with the outer surface of the drum. The engagement position of the band 81 is radially outward from the shaft bush 72a which supports the boss portion of the drum 72 on the cylindrical boss portion 10a. In this structure, a moment, which occurs in case there is an axial displacement between the engagement position and the support position, is prevented so that a load placed on the shaft bush 72a is reduced and the shaft bush 72a is downsized. Because the drum 72 is connected through the drum shape connecting member 14 to the sun gear S2, in case a load that occurs in the engagement of the band functions as a moment force, the load is placed on the shaft bush 14b supporting the sun gear S2. However, such a superfluous load is prevented by the arrangement of the shaft bush 72a so that the shaft bush 14b is also downsized. It should be noted that the hydraulic servo for the brake is omitted in the figures.

The brake B-3 forming one of the second engaging means is a multiple disc brake having a frictional member 93 structured from multiple frictional elements and separator plates. The separator plates are engaged with a spline engagement on the inner surface of the transmission case 10 and the frictional elements are engaged by a spline engagement with a hub 94 fixed to the carrier C2. The frictional member 93 of the brake B-3 is arranged at the radially outer side of the planetary gear having the small diameter of the planetary gear set G. The hydraulic servo 9 of the brake B-3 comprises the cylinder structured from a cylindrical trough portion formed on the rear end wall portion 10r of the transmission case 10, a piston 91 axially slidably inserted in the cylinder, a retainer fixed to the rear end wall portion 10r, and a return spring arranged between the piston 91 and the retainer. The outer surface of the extension portion, which is extended to the rear end of the frictional member 93 along with the surrounding wall of the transmission case 10, of the piston 91 is engaged with a spline formed on the case of surrounding wall.

Further, the one-way clutch F-1 forming the other one of the first engaging means is arranged at the front side of the third clutch C-3, that is, in the mostly front portion of the shift mechanism. The inner race is integrated with the drum 72, and the outer race is integrated with the hub of the brake B-2. The brake B-2 engaging the outer race with the transmission case 10 is a multiple disc brake having a frictional member structured from frictional elements and separator plates. The frictional elements are engaged with a spline engagement with the outer race, and the separator plates are engaged with an inner spline of the case 10. The hydraulic servo 9' of the brake B-2 comprises a cylinder 90' structured from the front end wall 10f of the transmission case 10, a piston 91' is axially slidably inserted in the cylinder 90', a retainer is fixed to the front end wall 10f of the case 10, and a return spring is arranged between the piston 91' and the retainer. In this arrangement, the hydraulic servo 9' of the brake B-2 is arranged in the front end wall of the transmission case 10. Therefore, no particular member for forming the hydraulic servo is needed. As a result, the number of members is reduced and the axial size of the transmission is reduced.

The one way clutch F-2 is arranged at the front side of the planetary gear set G. The inner race is connected to the front end portion of the carrier C2. The outer race is engaged with the spline on the inner surface of the transmission case 10.

In the aforementioned structure, the frictional member 63 of the first clutch C1 is arranged at the radially outer side of the reduction planetary gear G1, and the drum 62 of the hydraulic servo 6 is connected to the carrier C1 of the reduction planetary gear G1 and rotatably supported on the cylindrical boss portion 10a. The frictional member 53 of the second clutch C-2 is arranged at the radially outer side of the hydraulic servo 5, and the drum 52 of the hydraulic servo 5 is connected to the input shaft and the ring gear R1 of the reduction planetary gear G1 and fixed on the input shaft 11. The drum 72 of the hydraulic servo 7 of the third clutch C-3 is connected to the drum 62 of the first clutch C-1 through the frictional member 63 arranged in the radially outer side of the hydraulic servo of the first clutch C-1 and rotatably supported on the cylindrical boss portion 10a. A pair of seal rings 67 is arranged in the relational rotation portion between the cylindrical boss portion 10a and the drum 62 of the first clutch C-1 for sealing the hydraulic path L1 connected to the hydraulic servo 6 of the first clutch C1 from the cylindrical boss portion 10a. A pair of seal rings 77 is arranged in the relational rotation portion between the cylindrical boss portion 10a and the drum 72 of the third clutch C-3 for sealing the hydraulic path L3 connected to the hydraulic servo 7 of the third clutch C-3 from the cylindrical boss portion 10a. A pair of seal rings 57 is arranged in the relational rotation portion between the cylindrical boss portion 10a and the input shaft 11 for sealing the hydraulic path L2 connected to the hydraulic servo 5 of the second clutch C-2 from the cylindrical boss portion 10a.

Seal rings are arranged in hydraulic paths applying hydraulic pressure to the hydraulic servos of the clutches C-1, C-2, C-3 for sealing at positions between members which rotate relatively to one other. In the case where many seal rings are arranged in one hydraulic path, the cost increases. Further, when a hydraulic pressure is applied to the hydraulic path, the pressure is applied to the seal rings so that sliding resistance increases. Thus, the loss in power transmission efficiency increases. Therefore, it is better that the number of seal rings be reduced.

In this embodiment, a pair of seal rings is arranged in the hydraulic path connecting the hydraulic path L1 formed in the cylindrical boss portion 10a of the transmission case 10 to the hydraulic servo 6 of the first clutch C-1, a pair of seal rings is arranged in the hydraulic path connecting the hydraulic path L2 to the hydraulic servo 5 of the second clutch C-2, and a pair of seal rings is arranged in the hydraulic path connecting the hydraulic path L3 to the hydraulic servo 7 of the third clutch C-3. That is, in total there are three pairs of seal rings which minimizes the number of seal rings arranged for sealing at the three relative rotational portions. Thus, in this embodiment, the number of seal rings is reduced and an automatic transmission in which the loss of power transmission is small results.

According to the structure of the aforementioned embodiment, an automatic transmission, which has good efficiency and in which the number of seal rings is minimized without using a center support, the axial size is not increased, the number of members is not increased and the power loss is minimized, is provided with a reasonable cost. Further, the input element of the reduction planetary gear G1 is connected through the clutch drum 52 of the second clutch to the input shaft 11. Therefore, the input member to the reduction planetary gear G1 is in common with the clutch drum, the axial size is reduced, and the number of members is reduced. Further, the hydraulic servo 5 of the second clutch C-2 is arranged on the input shaft 11 so that the pressure receiving area of the piston of the hydraulic servo 5 second clutch C-2 is enlarged. As a result, the frictional member 53 is relatively downsized, that is, the number of the structural members is reduced and the structural members are downsized. Further, in the gear train, as shown in FIG. 2, the second clutch C-2 is always engaged in the high speed ratios higher than the fourth ratio. Thus, when the hydraulic pressure is applied to the clutch C-2, the seal ring 57 slides between the input shaft 11 and the cylindrical boss portion 10a. However, in this embodiment, the diameter of the seal ring 57 is smaller than the diameters of other seal rings. Therefore, the sliding resistance is reduced.

Figure 4:
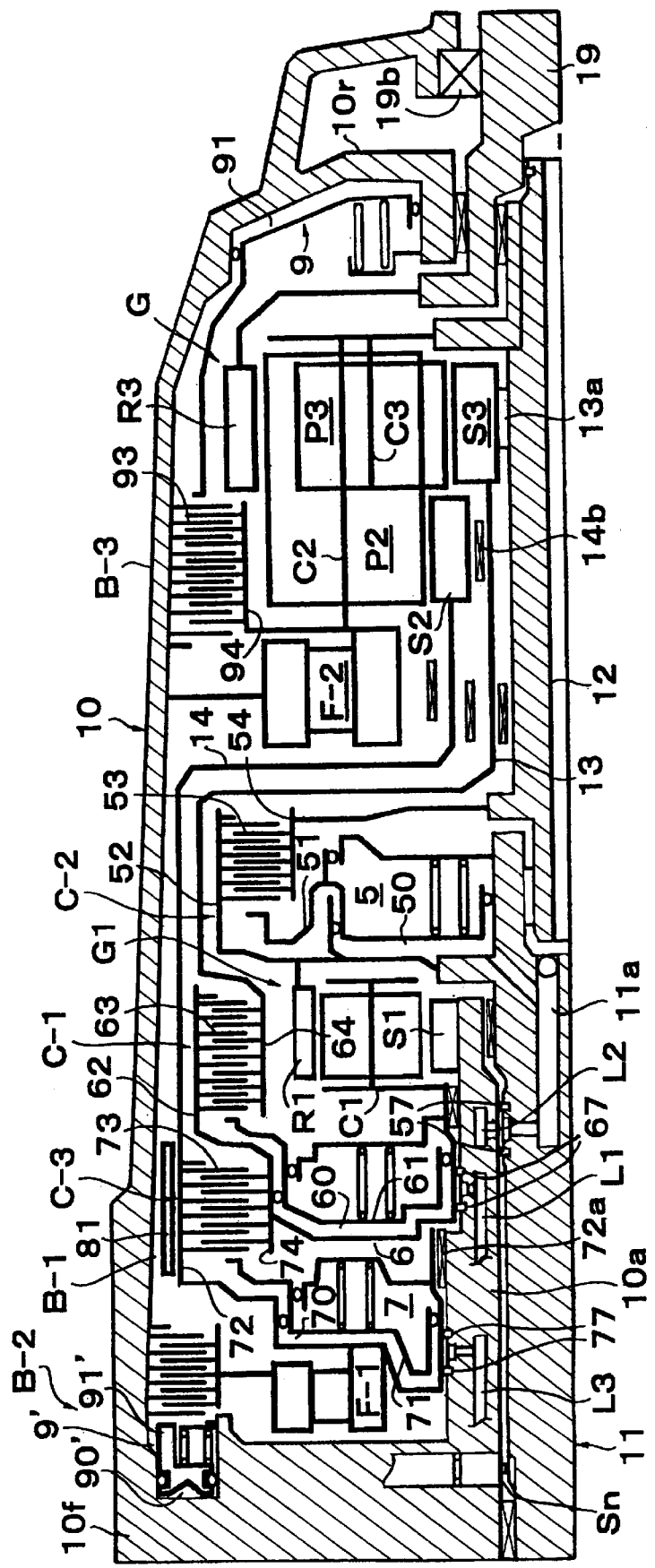
FIG. 4 is a cross sectional diagram simply illustrating the gear train in the first embodiment.

It should be noted that, in FIG. 4, illustrating the aforementioned embodiment, a notation Sn denotes an input rotation sensor. The sensor Sn is needed to detect the input rotation as data transmitted to an electronic control system for transmission control. The sensor Sn is buried in the front end wall 10f for protecting the detecting portion from a lot of rugged portions formed on the outer surface of the input shaft 11.

In the aforementioned first embodiment, the power to the input side member of the third clutch C-3 is transmitted from the drum 62 of the first clutch C-1 to the inner side hub 74 of the third clutch C-3. As a result the axial size is reduced by the arrangement of the first and third clutches C-1, C-3. However, it is effective that the power to the third clutch C-3 be transmitted to the outer side drum 72 as the input side member to make it easy to detect the input rotation. In the description for each embodiment, the mutual arrangement of the first and third clutches C-1, C-3 in the first embodiment is simply defined or described as a first clutches arrangement, and the mutual arrangement of the clutches in the second embodiment is simply defined or described as a second clutches arrangement.

Figure 5:
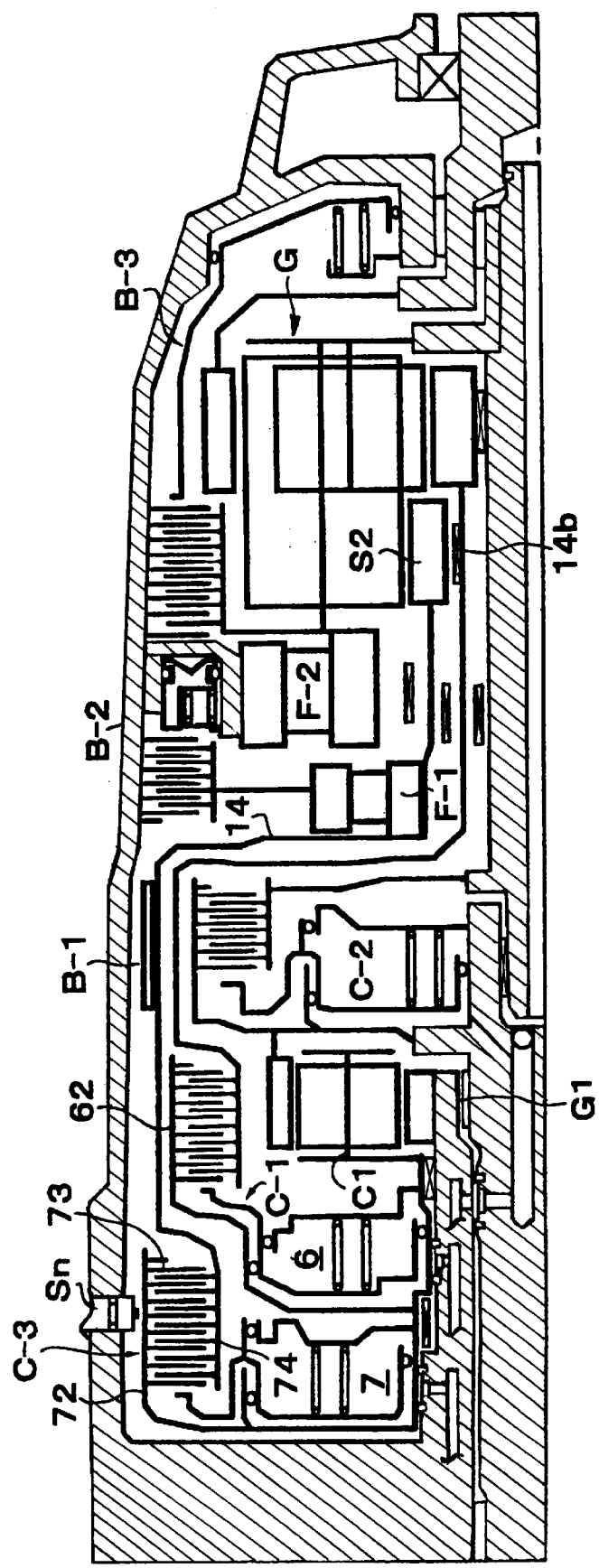
FIG. 5 is a cross sectional diagram simply illustrating the gear train in the second embodiment.

FIG. 5 simply illustrates a gear train of an automatic transmission of the second embodiment thus structured using a cross sectional view. Only the differences from the first embodiment will be described while avoiding duplication of the descriptions of similar structures.

In the second embodiment, the connecting relationship between the third clutch C-3 and the reduction planetary gear G1 is changed from the first embodiment. That is, the clutch drum 72 of the hydraulic servo 7 of the third clutch C-3 is connected to the carrier C1 as the output element of the reduction planetary gear G1 in parallel with the clutch drum 62 of the hydraulic servo 6 of the first clutch C-1. The frictional member 73 is arranged at the radially outer side of the hydraulic servo 7 of the third clutch C-3 and the hydraulic servo 6 of the first clutch C-1. In the frictional member 73, the power is transmitted from the drum 72 to the hub 74. In this arrangement, the clutch drum 72, which is always inputted the output rotation from the reduction planetary gear G1, is positioned in the mostly radial outer side of the shift mechanism. Therefore, the input rotation, which is needed for the automatic transmission control, is detected easily without burying the detecting means deep in the transmission case 10. Therefore, in this embodiment, the input portion rotation sensor Sn is arranged in the surrounding portion of the transmission case 10.

In the first embodiment, the drum 72 of the third clutch C-3 is used as the drum of the band brake B-1 as the first engaging means. However, in the second embodiment, thus arrangement can not be used because of the aforementioned detection of the input rotation. Therefore, the one way clutch F-1 and the brake B-2, which are arranged at the front side of the third clutch C-3 in the first embodiment, are arranged between the reduction planetary gear G1 and the one-way clutch F-2. The band brake B-1 having the drum shape connecting member 14 as the drum is arranged in a nearby position to them. In this arrangement, the inner race of the one-way clutch F-1 having relatively high rigidity is used as a support portion for the drum so that a moment, which occurs from the load during brake engagement, is received by the inner race. As a result, the moment load is not transmitted to the shaft bush 14b of the sun gear S2. According to the change in the layout, the hydraulic servo 9' of the brake B-2 is separately arranged within the transmission case 10 at the radially outer side of the outer race of the one-way clutch F-2.

Figure 6:
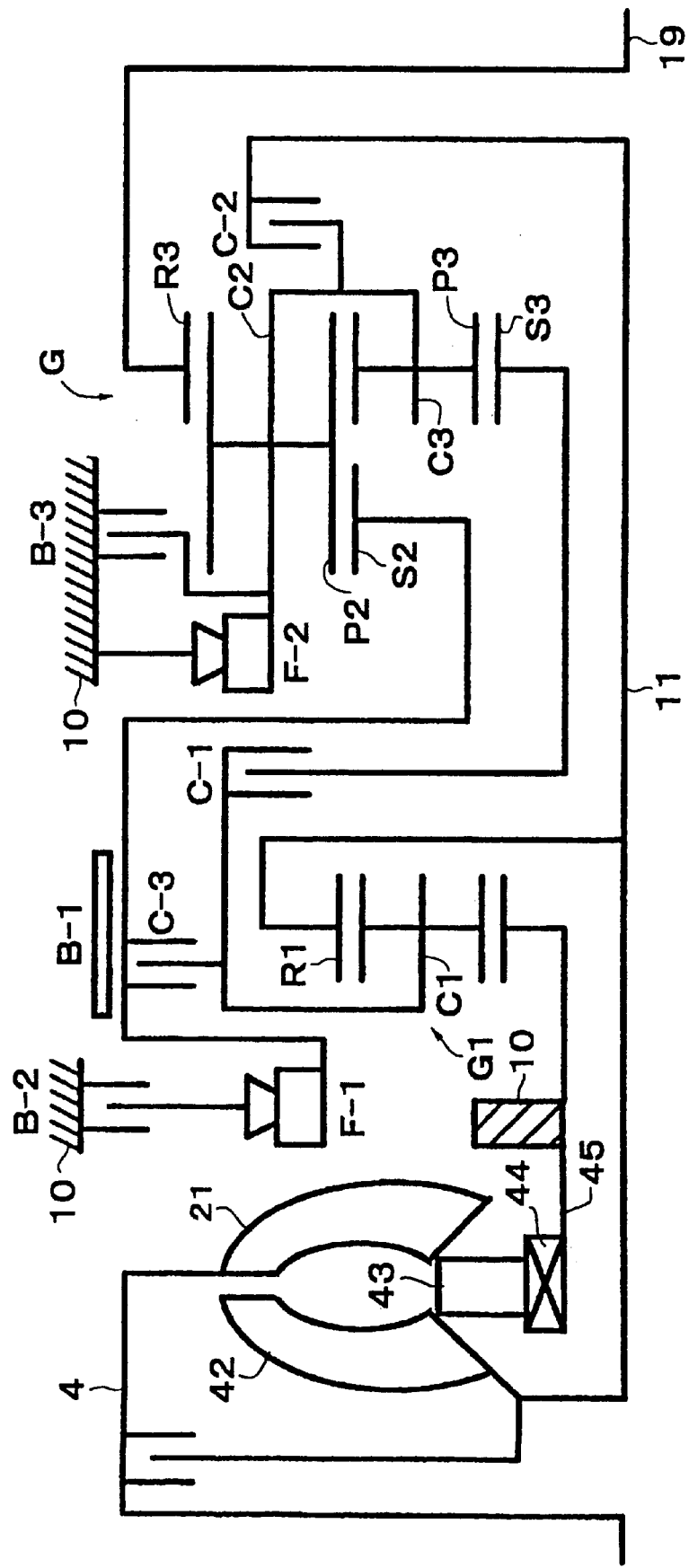
FIG. 6 is a schematic diagram illustrating the structure of the third embodiment.
Figure 7:
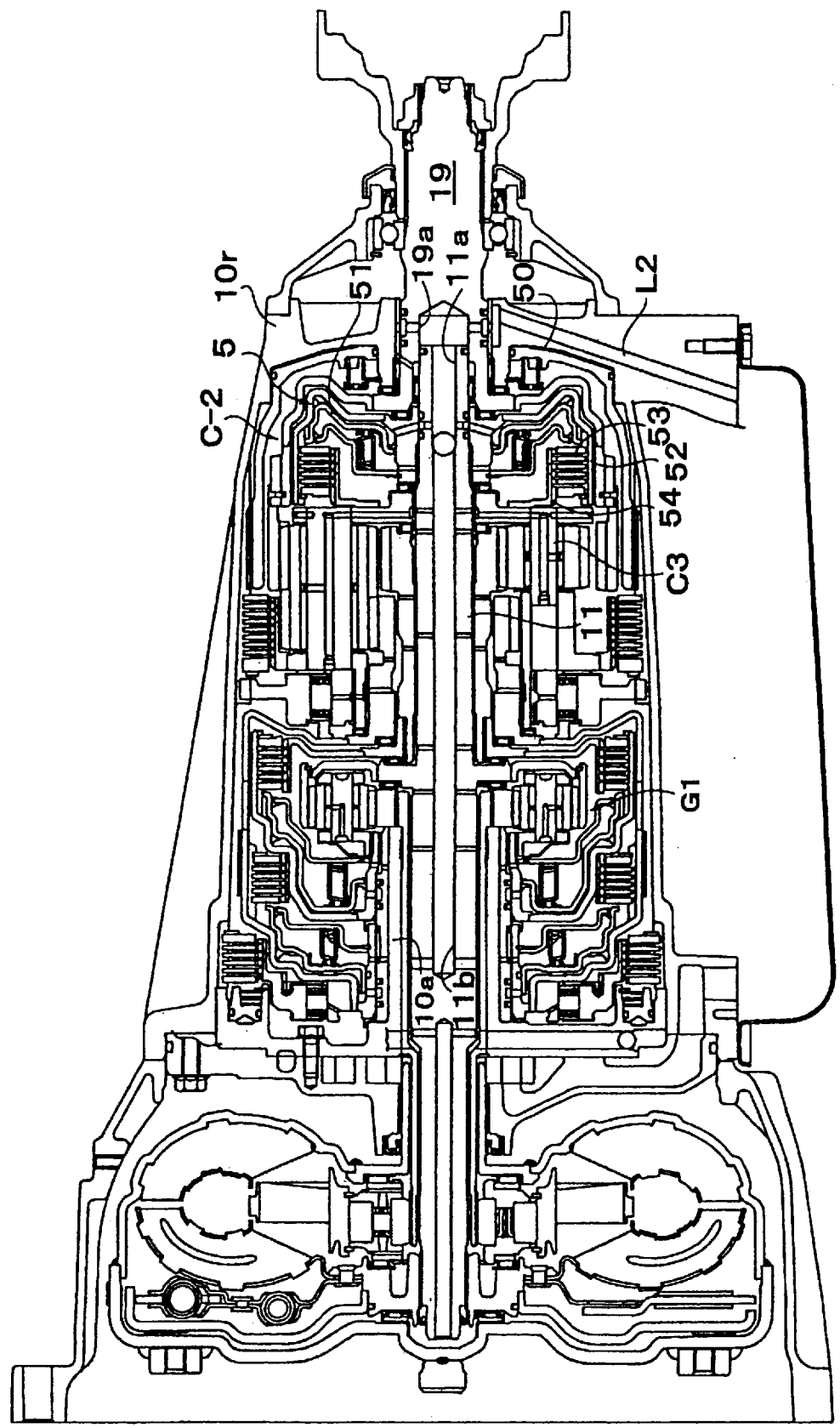
FIG. 7 is a detailed cross sectional diagram of the third embodiment.

In the aforementioned embodiments, the second clutch C-2 for inputting the non-decelerated rotation is arranged nearby the reduction planetary gear G1 and at the front side of the planetary gear set G. However, the second clutch C-2 can be arranged at the rear side of the planetary gear set G. FIGS. 6 and 7 illustrate the third embodiment having such an arrangement using a schematic diagram and a cross sectional view.

In this embodiment, as illustrated in the schematic diagram of FIG. 6, by moving the second clutch C-2 to the rear side, the intermediate shaft is eliminated because the input shaft 11 is extended to the rear end portion of the shift mechanism. In this case, as illustrated in FIG. 7, the rear end portion of the input shaft 11 is supported by the shaft hole of the output shaft 19 in the same way as the rear end portion of the intermediate shaft 12 was supported in the first and second embodiments. The rear end portion of the drum 52 of the second clutch C-2 is fixed to the rear end side flange of the input shaft 11 and supported at one side. The frictional member 53 of the clutch C-2 is structured from multiple frictional elements and separator plates. The separator plates are engaged on the inner surface of the drum 52 and the inner portions of the frictional elements are engaged on the outer surface of the hub 54. The frictional member 53 is arranged between the drum 52 and the hub 54. The front end of the hub 54 is fixed to the carrier C3 of the planetary gear set G and supported at one side. The hydraulic servo 5 of the clutch C-2 comprises the cylinder 50 defined by the inner side of the drum 52 and the outer surface of the input shaft 11, a piston 51 is axially slidably inserted in the cylinder 50, a cancel plate is fixed on the input shaft, and a return spring is arranged between the piston 51 and the cancel plate.

In the third embodiment, one hydraulic path is formed in the input shaft 11. The hydraulic path is divided to the front side and the rear side by arranging a plug at the axial position of the second clutch C2. The front side hydraulic path 11b is for lubrication and the rear side hydraulic path 11a is for applying a hydraulic pressure to the second clutch C-2. Therefore, in this case, the hydraulic path formed in the output shaft 19 is connected through the hydraulic path L2 formed in the rear end wall portion 10r of the transmission case 10 to the valve body (not shown). The front end portion of the hydraulic path 11b for lubrication is connected through a hydraulic path (not shown) formed in the front boss portion 10a to the valve body.

Here, a number of seal rings, which are arranged between members that rotate relative each other, seal the hydraulic paths for applying hydraulic pressure to the hydraulic servos of the clutches or lubrication oil to the entirety of the automatic transmission and a number of hydraulic paths positioned in the shaft 11. As illustrated in FIG. 7, a pair of seal rings and a single seal ring are arranged in the hydraulic path from the rear end portion of the transmission case 10 to the hydraulic servo 5 of the second clutch C-2, a pair of seal rings is arranged in the hydraulic path for applying the hydraulic pressure to the hydraulic servo of the first clutch C-1 from the hydraulic path formed in the cylindrical boss portion 10a of the transmission case 10, a pair of seal rings is arranged in the hydraulic path for applying the hydraulic pressure to the hydraulic servo of the third clutch C-3 from the hydraulic path formed in the cylindrical boss portion 10a of the transmission case 10, and a pair of seal rings (not shown) is arranged in the hydraulic path for applying the hydraulic pressure to the hydraulic path for lubrication from the hydraulic path formed in the cylindrical boss portion 10a of the transmission case 10. Therefore, there is a total of five pairs of seal rings and a single seal ring in the automatic transmission. Further, one hydraulic path is formed in the shaft. Thus, in this embodiment, the number of seal rings and the number of hydraulic paths in the shaft are reduced so that the loss in power in the transmission is reduced. As a result, an automatic transmission having small axial size is formed. Further, the hydraulic path L2 for the hydraulic servo 5 of the second clutch C-2 is formed in the rear end portion of the case 10 so that a concentration of hydraulic paths in the cylindrical boss portion 10a is prevented.

Each of the aforementioned embodiments is embodied with a parallel type automatic transmission for a front engine/rear wheel drive vehicle. However, the invention can be applied to a transverse type automatic transmission for a front engine/front wheel drive or rear engine/rear wheel drive vehicle. An embodiment having this type transmission will now be described.

Figure 9:
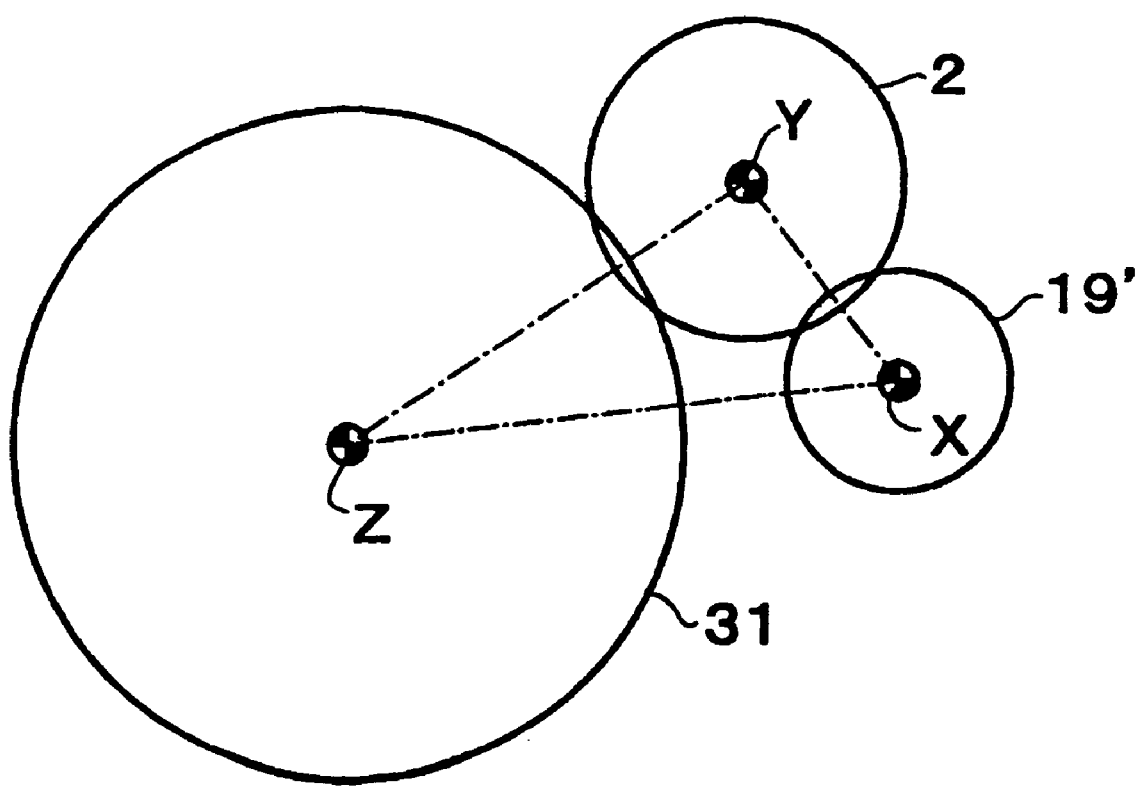
FIG. 9 is an arrangement diagram illustrating axis arrangements in the fourth embodiment.

FIGS. 8 through 12 illustrate a transverse type automatic transmission as a transaxle of the fourth embodiment. FIG. 8 illustrates the gear train using a schematic diagram. In the figure, the axes are shown deployed on a common plane. FIG. 9 illustrates the actual positional relationship of the axes. The automatic transmission is structured from three axis, which are a main axis X, a counter axis Y and a differential axis Z arranged in parallel with each other. The elements are arranged on the various axes. The planetary gear set G1, which has the same structure as the previously described embodiments, has four shift elements S2, S3, C2 (C3), R3; the reduction planetary gear G1; and the three clutches C-1, C-2, C-3 which are arranged around the input shaft 11 on the main axis X. Further, the two brakes B-1, B-2 and the one one-way clutch F-1 are also arranged around the main axis x. However, there are some differences from the aforementioned embodiments.

In the case of this automatic transmission, the small sun gear S3, as the first shift element of the planetary gear set G, is connected through the first clutch C-1 and the reduction planetary gear G1 to the input shaft 11. The large sun gear S2, as the second shift element, is connected through the third clutch C-3 and the reduction planetary gear G1 to the input shaft 11 and can be engaged with the case 10 by the first brake B-1. The carrier C2 (C3), as the third shift element, is connected through the second clutch C-2 to the input shaft 11 and can be engaged with the case 10 by the brake B-2 and the one-way clutch F-1 which are equivalent in that they function in a similar manner to the second brake B-3 and the one-way clutch F-2 in the previous embodiments. The ring gear R3, as the fourth shift element, is connected as the output element to a counter drive gear 19'. In the embodiment, the one-way clutch F-1 and a frictional element, which is equivalent to the brake B-2 arranged in series with the one-way clutch F-1, as arranged in the first embodiment are displaced. The layout is changed because the axial size is quite limited compared with the parallel type.

The gear train in the embodiment, especially the differences from the previously described embodiments, will be described in further detail. The torque converter 4, which transmits the engine rotation to the input shaft 11 and has a lock-up clutch, is arranged on the main axis X. An idler gear 2, which inverses the output from the main axis side and engages with the counter drive gear 19' for transmitting the output to a differential unit 3, is arranged on the counter axis Y. A differential ring gear 3 which is engaged with the idler gear 2 and fixed to a differential case 32, is arranged on the differential axis Z. A differential rotation of differential gears arranged in the differential case 32 is outputted to left and right shafts 30. Thus, the differential rotation is the wheel driving force.

Figure 11:
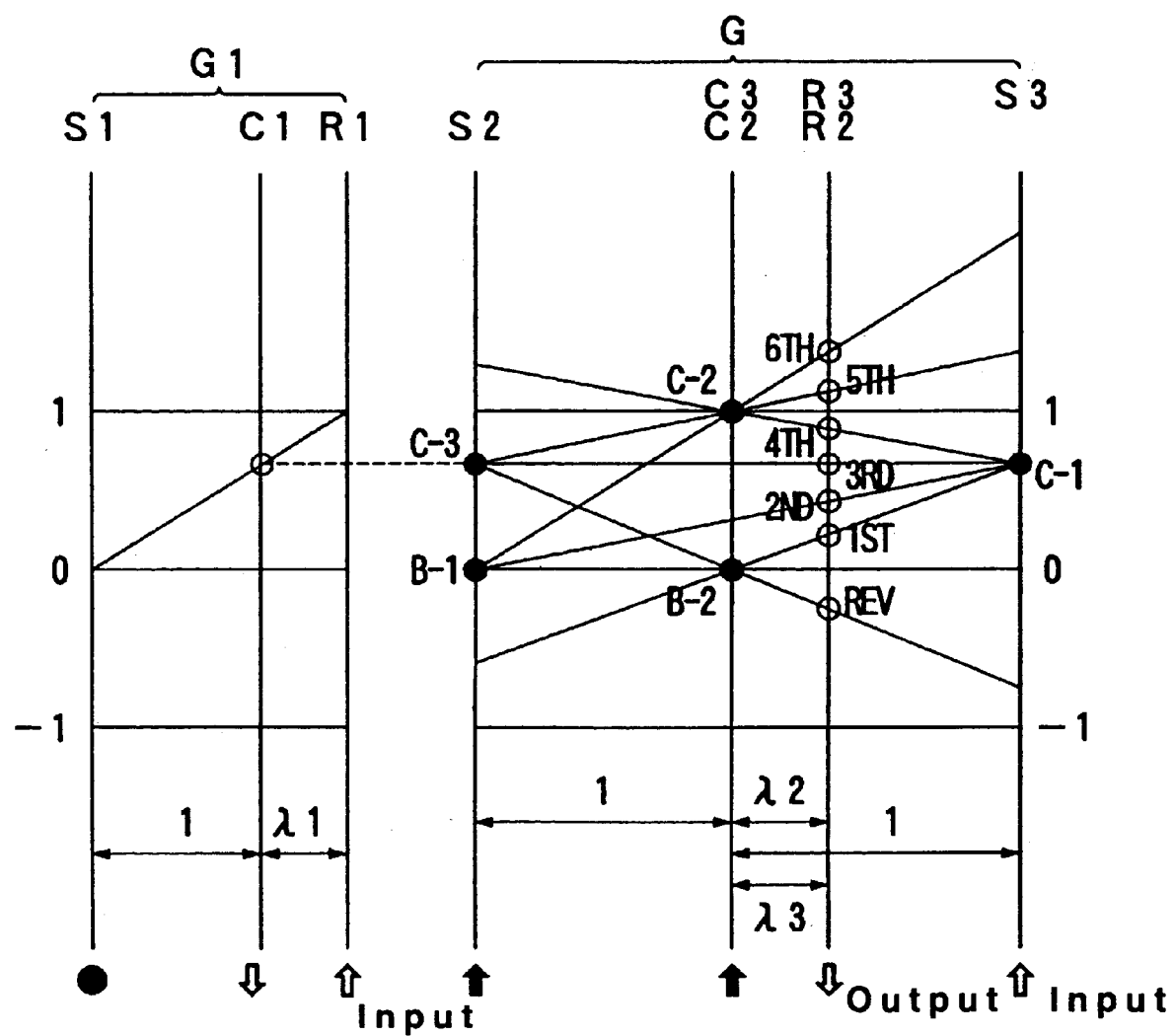
FIG. 11 is a velocity diagram for the gear train in the fourth embodiment.

The structures of the planetary gear set G and the reduction planetary gear G1 and the connecting relationship between them and the engagement elements are the same as the aforementioned embodiments. Therefore, the gear stages established with this transmission are substantially the same as with the aforementioned embodiments. FIG. 10 shows the gear stages, which are established by the engagement and disengagement of each clutch and brake, using a table. In the table, the symbol ○ means engagement, the symbol ○ with brackets means engagement which is performed only in the case where an engine brake is established, and a blank means disengagement. FIG. 11 shows the gear stages, which are established by the engagement and disengagement of each clutch and brake, and a relationship with the rotational ratio of each shift element in each gear stage with a velocity diagram. In this diagram, a symbol ● means engagement. The description of the power transmission in the each gear stage is omitted to preclude redundancy and because it can be analogized from the description of the first embodiment.

As shown with the clearance in the up/down direction between the symbols ○, which shows the speed ratios of the ring gear R2, R3 on the velocity diagram in FIG. 11, each gear stage established in this embodiment has a proper speed step having a relatively equal interval to the adjacent gear stage. The relationship is shown with gear ratios and steps in FIG. 10 by specifically setting values and quantitatively showing. In this case, a teeth number ratio $\lambda 1$ between the sun gear S1 and the ring gear R1 of the reduction planetary gear G1 equals 44/78, a teeth number ratio $\lambda 2$ between the sun gear S2 and the ring gear R2 (R3) of the planetary gear set G equals 36/78, and a teeth number ratio $\lambda 3$ between the sun gear S3 and the ring gear R3 of the planetary gear set G equals 30/78, and each input/output gear ratio is first speed (1ST): $(1+\lambda 1)/\lambda 3=4.067$,
second speed (2ND): $(1+\lambda 1)(\lambda 2+\lambda 3)/\lambda 3(1+\lambda 2)=2.354$,
third speed (3RD): $1+\lambda 1=1.564$,
fourth speed (4TH): $(1+\lambda 1)/(1+\lambda 1-(\lambda 1*\lambda 3))=1.161$,
fifth speed (5TH): $(1+\lambda 1)/(1+\lambda 1+(\lambda 1*\lambda 2))=0.857$,
sixth speed (6TH): $1/(1+\lambda 2)=0.684$, and
reverse speed (REV): $-(1+\lambda 1)/\lambda 2=3.389$.

The steps between the gear ratios are
between the first and second speed: 1.73,
between the second and third speed: 1.51,
between the third and fourth speed: 1.35,
between the fourth and fifth speed: 1.35, and
between the fifth and sixth speed: 1.25.

Figure 12:
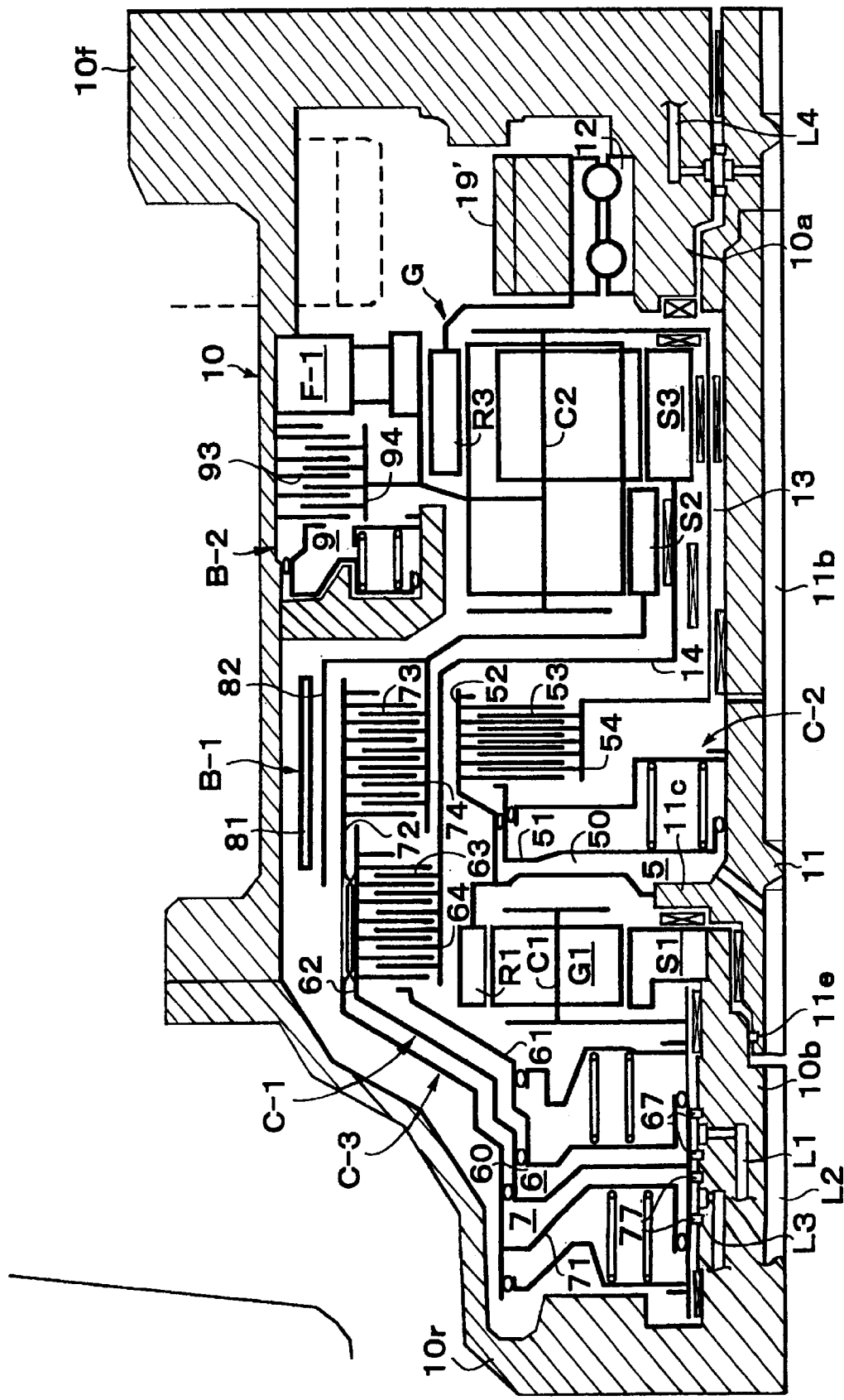
FIG. 12 is a cross sectional diagram simply illustrating a gear train of the fourth embodiment.

FIG. 12 illustrates the specific structure of the automatic transmission using a simplified cross sectional diagram. Each structural element, which has been described with reference to the schematic diagram, has the same reference numeral or notation, and the description of those elements are substantially omitted. Detail portions, which are not shown in the schematic diagram, will be described.

The case 10 accommodating the shift mechanism comprises the front boss portion 10a extending to the inner side of the case from the front end wall 10a and a rear boss portion 10b extending to the inner side of the case from the rear end wall 10r. The front and rear end portions of the input shaft 11 are supported through bearings on the inner surfaces of both boss portions 10a, 10b. In this embodiment, the hydraulic path L4, which is opened to the inner side of the boss portion 10a, is for lubrication and formed in the front boss portion 10a. The two hydraulic paths L1, L3, which are opened to the outer side of the boss portion 10b are for the hydraulic servos and formed in the rear boss portion 10b. The hydraulic path L2, which is open to the end of the input shaft 11 at an inner side of the boss portion, is for the hydraulic servo of the clutch C-2 and is formed in the rear boss portion 10b.

A flange 11c is formed adjacent the rear side support portion on the input shaft 11. A shaft hydraulic path, which is axially divided into three parts, is formed in the input shaft 11. The front portion of the shaft hydraulic path is used for applying/draining a secondary pressure to/from the torque converter. The intermediate portion 11b of the shaft hydraulic path is connected to the lubrication hydraulic path L4 and used for applying a lubrication pressure. The rear portion 11d of the shaft hydraulic path is connected to the case hydraulic path L2 and used for applying/draining the servo pressure, that is, a line pressure to clutch C-2. Therefore, the intermediate portion of the lubrication hydraulic path 11b is opened to the outer side of the input shaft 11 through a plurality of radial hydraulic holes formed between the front boss portion 10a and the rear boss portion 10b so that the lubrication oil is effused from the hydraulic holes by centrifugal force produced by the rotation of the input shaft 11.

The sun gear S3 of the planetary gear set G is supported by a bearing on the torque transmission member 13 which is, in turn, supported through bearings on the input shaft 11. The sun gear S2 is supported by a bearing on the shaft portion of the sun gear S3. The sun clear S3, as the first shift element of the planetary gear set G, is connected through the connecting member 14 to the hub 64 of the first clutch C-1. The sun gear S2, as the second shift element, is connected to the hub 74 of the third clutch C-3. The carrier C2 (C3), as the third shift element, is connected through the torque transmission member 13 to the hub 54 of the second clutch C-2. The ring gear R2 (R3), as the fourth shift element, is connected to the counter drive gear 19' arranged in a front adjacent neighbor position to the ring gear R2 (R3).

The reduction planetary gear G1 is arranged to the rear side of the second clutch C-2. The sun gear S1, as the reaction element, is fixed on the end portion of the rear boss portion 10b. The ring gear R1, as the input element, is connected to the flange 11c of the input shaft 11. The carrier C1, as the output element, is connected to the common cylinder 60 of the hydraulic servos 6, 7 of the first and third clutches C-1, C-3.

The hydraulic servos 6,7 of the first and third clutches C-1, C-3 are arranged to the rear side of the reduction planetary gear G1 and comprise the common cylinder 60 rotatably supported on the rear boss portion 10b of the transmission case, the first piston 61 inserted in the inner side of the cylinder 60 and the second piston 71 covering the outer side of the cylinder 60. The common cylinder 60 provides the drum 62 of the first clutch C-1 by an increase in the diameter and extending the radial outer portion in the axial direction. Similarly, the piston 71 provides the drum 72 of the third clutch C-3 by an increase in the diameter and extending the radial outer portion in the axial direction. Both drums 62, 72 are connected via a spline engagement to transmit the torque to each other. That is, the cylinder 60 structuring the hydraulic servos 6, 7 is common, the hydraulic servos 6, 7 of the first and third clutches C-1, C-3 comprise one piston 61 inserted in the inner side of the cylinder 60 and the other piston 71 covering the outer side of the cylinder 60. The operational directions of the pistons 61, 71 are opposite to one another by arrangement of the hydraulic servos back to back. Therefore, the hydraulic servos are made compact by the combination. The structure will be called a third clutches arrangement or a three clutches arrangement. Also in this embodiment, each hydraulic servo comprises the cancel plate and the return spring.

The frictional member 63 of the first clutch C-1 is structured from multiple disc frictional elements, of which an inner portion is in a spline engagement with the hub 64, and separator plates, of which an outer portion is in a spline engagement with the drum 62. The frictional member 63 transmits the torque from the drum 62 to the hub 64 when the frictional member 63 is engaged by pinching with a backing plate fixed on the end of the drum 62 and the piston 61, which slides out from the cylinder 60 upon application of the hydraulic pressure to the hydraulic servo 6.

The frictional member 73 of the third clutch C-3 is structured from a multiple disc frictional elements, of which an inner portion is in a spline engagement with the hub 74, and separator plates, of which an outer portion is in a spline engagement with the drum 72. The frictional member 73 transmits the torque from the drum 72 to the hub 74 when the frictional member 73 is engaged by pinching with a backing plate fixed on the end of the drum 72 and the piston 71, which slides out from the cylinder 60 upon application of hydraulic pressure to the hydraulic servo 7. The frictional members 63, 73 of the first and third clutches C-1, C-3 are axially aligned with each other.

The second clutch C-2, including the hydraulic servo 5, is arranged at the front side of the reduction planetary gear G1, that is, between the planetary gear set G and the reduction planetary gear G1. The hydraulic servo 5 is arranged on the input shaft 11. The inner portion of the hydraulic servo 5 is connected to the flange 11c of the input shaft 11. The hydraulic servo 5 is structured from the cylinder 50 formed from the drum 52, of which the diameter is increased and of which the outer portion is extended in the axial direction, the piston 51 is seated in the cylinder 50, the cancel plate for canceling a centrifugal pressure, and the return spring.

The frictional member 53 of the second clutch C-2 is structured from multiple disc frictional elements, of which an inner portion is in a spline engagement with the hub 54, and separator plates, of which an outer portion is in a spline engagement with the drum 52. The frictional member 53 transmits the torque from the drum 52 to the hub 54 when the frictional member 53 is engaged by pinching with a backing plate fixed on the end of the drum 52 and the piston 51, which slides out from the cylinder 50 upon application of the hydraulic pressure to the hydraulic servo 5. The frictional member 53 is arranged at the radial inner side of the frictional members 63, 73.

The first brake B-1 is a band brake. The brake band 81 of the band brake constricts the drum 82 connected to the hub 74 of the third clutch C-3. Therefore, the first brake B-1 is arranged without increasing the axial space or length, and the radial size of the transmission is barely increased. The hydraulic servo of the band brake is arranged in an axial aligned position, with the axial position of the brake band 81 extending at a tangent to the drum 82. The hydraulic servo of brake B-1 is not shown in the figures.

The second brake B-2 is structured from a multiple discs similarly to each clutch C-1 through C-3. The hydraulic servo 9 and the frictional member 93 are arranged at the radial outer side of the planetary gear set G and aligned with the one-way clutch F-1. The hub 94 of the brake B-2 and the inner race of the one-way clutch F-1 are connected to the carrier C2 (C3). Especially, the hydraulic servo 9 of the second brake B-2 is arranged in the radial outer position of the portion of the transmission in which there is no ring gear of the ravegneaux type planetary gear set G.

The counter drive gear 19' is supported through a bearing 12 on the front boss portion 10a of the case 10 and arranged in the front end of the shift mechanism. In this structure, the counter drive gear 19' is supported without arranging a particular support on the case 10. Therefore, the case 10 is lightened.

The hydraulic servo 5 of the second clutch C-2 is connected through a shaft hydraulic path 11d formed in the input shaft 11 to the case hydraulic path L2 formed in the rear boss portion 10b of the case 10. It is known the case hydraulic path L2 is connected to a line pressure hydraulic path in the valve body of the hydraulic control system. The hydraulic servos 6, 7 of the first and third clutches C-1, C-3 are connected to the two case hydraulic paths L1, L3 individually formed in the boss portion 10b. These two hydraulic paths L1, L3 are individually sealed with a pair of seal rings 67, 77 which are arranged in the relative rotational portions between the hydraulic servos 6, 7 and the boss portion 10b. As with the case hydraulic path L2, the two case hydraulic paths L1, L3 are connected to the line pressure hydraulic path in the valve body of the hydraulic control system.

As mentioned, the hydraulic path 11d, connected to the hydraulic servo 5 of second clutch C-2, is sealed with a seal ring 11e inserted between the inner surface of the rear boss portion 10b of the rear end portion of the case 10 and the outer surface of the rear end portion of the input shaft 11. Thus, the hydraulic servo 5 of the second clutch C-2 is fixed on the input shaft 11 and connected through the shaft hydraulic path 11d formed in the input shaft 11 to the hydraulic path L2 formed in the rear boss portion 10b of the case 10. Therefore, the hydraulic path is sealed with the single seal ring 11e having a small diameter at the support portion of the input shaft 11 to the case 10. Ordinary, a hydraulic path needs a pair of seal rings for sealing at a relative rotational portion. Compared with that, in this case, the number of seal rings is reduced. Therefore, the sliding resistance is reduced by reducing the number of seal rings and by the small diameter of the seal ring. As a result, the power transmission efficiency of the transmission is improved.

The hydraulic servos 6, 7 of the first and third clutches C-1, C-3, which are the other two clutches, are arranged on the boss portion 10b, which is formed for supporting the reduction planetary gear G1 and extended from the case 10. Therefore, there is one relative rotational portion in each of the hydraulic paths L1, L3. As a result, the two hydraulic paths are each sealed with a pair of seal rings 67, 77 which is the ordinary basic number of seal rings. Therefore, the number of seal rings, which seal all of the hydraulic paths L1–L3, including the hydraulic servos 5, 6, 7 of the first through third clutches C-1 through C-3, is minimized.

The lubrication hydraulic path 11b is formed at the front side of the shaft hydraulic path 11d in the input shaft 11. The lubrication hydraulic path 11b is connected to the hydraulic path L4 formed in the front boss portion 10a of the front end portion of the case 10. In this structure, the input shaft 11 is used for applying the hydraulic pressure to the hydraulic servo 5 of the second clutch, and further used for applying the lubrication oil to the planetary gear set G. Moreover, the shaft hydraulic path 11d for the hydraulic servo 5 and the lubrication hydraulic path 11b are not superposed in the input shaft. Therefore, the diameter of the input shaft is reduced. Because of the reduction in the diameter of the input shaft 11, the diameters of the sun gears S2, S3, which are supported by the input shaft 11, of the planetary gear set G are also reduced. Further, the entire planetary gear set G, which is the heaviest member, is compactly structured, and the transmission is lightened.

Figure 13:
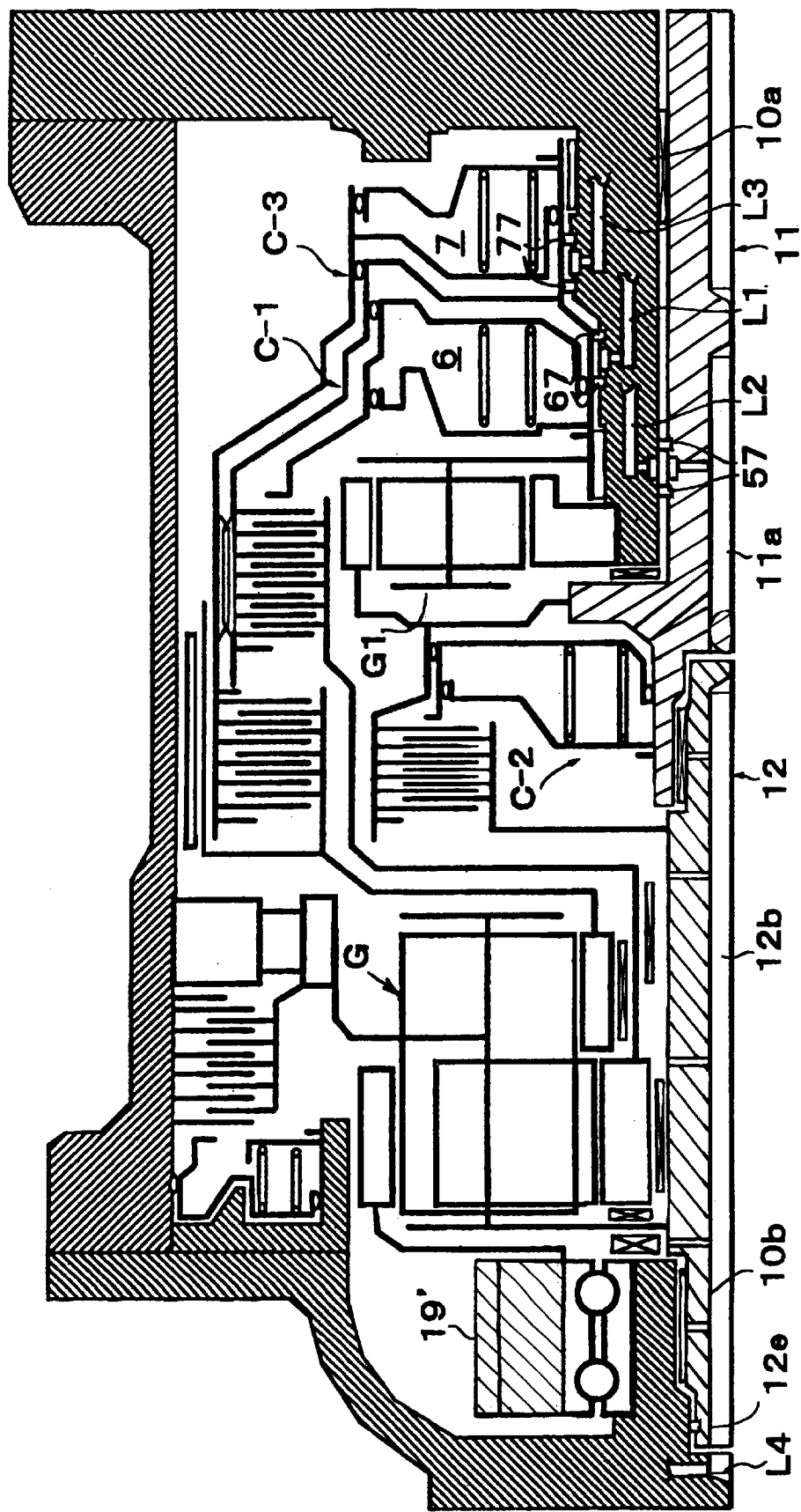
FIG. 13 is a cross sectional diagram simply illustrating a gear train of the fifth embodiment.

FIG. 13 illustrates the fifth embodiment. The difference between this embodiment and the fourth embodiment using the three clutches arrangement is the arrangement of the each element is substantially reversed as shown, with a simplified cross sectional view. In this case, the reduction planetary gear G1 and the hydraulic servos 6, 7 of the first and third clutches C-1, C-3, which are arranged on the rear boss portion 10b of the case 10 in the fourth embodiment, are arranged on the front boss portion 10a in this embodiment. The order of the clutches C-1, C-3, and the direction of orientation are also reversed. Because of that, the counter drive gear 19' is supported on the rear boss portion 10b. According to the reversed arrangement, the input shaft 11 ends at the position in which the second clutch is arranged. Therefore, the intermediate shaft 12 is arranged in a similar manner as the first embodiment. The hydraulic paths for the hydraulic servos are the same as the first embodiment. That is, the hydraulic pressures are applied to the hydraulic servos 6, 7 of the first and third clutches C-1, C-3 from the case hydraulic paths L1, L3 formed in the front boss portion 10a, the hydraulic pressure is applied to the hydraulic servo 6 of the second clutch C-2 from the case hydraulic path L2 formed in the front boss portion 10a through the shaft hydraulic path 11a formed in the input shaft 11, and the hydraulic pressure is applied to the lubrication hydraulic path 12b, formed in the intermediate shaft 12, from the case hydraulic path L4 formed in the rear boss portion 10b through the shaft end of the intermediate shaft 12. In this case, the number of seal rings needed are three pairs and a single seal ring as shown with reference numerals 57, 67, 77, 12e. It is the same as the first embodiment. It should be noted that, because the counter drive gear 19' is arranged in the rear portion of the shift mechanism, the output of the counter drive gear 19' is transmitted through a counter driven gear having a deceleration function and a differential drive pinion gear to the differential unit.

Figure 14:
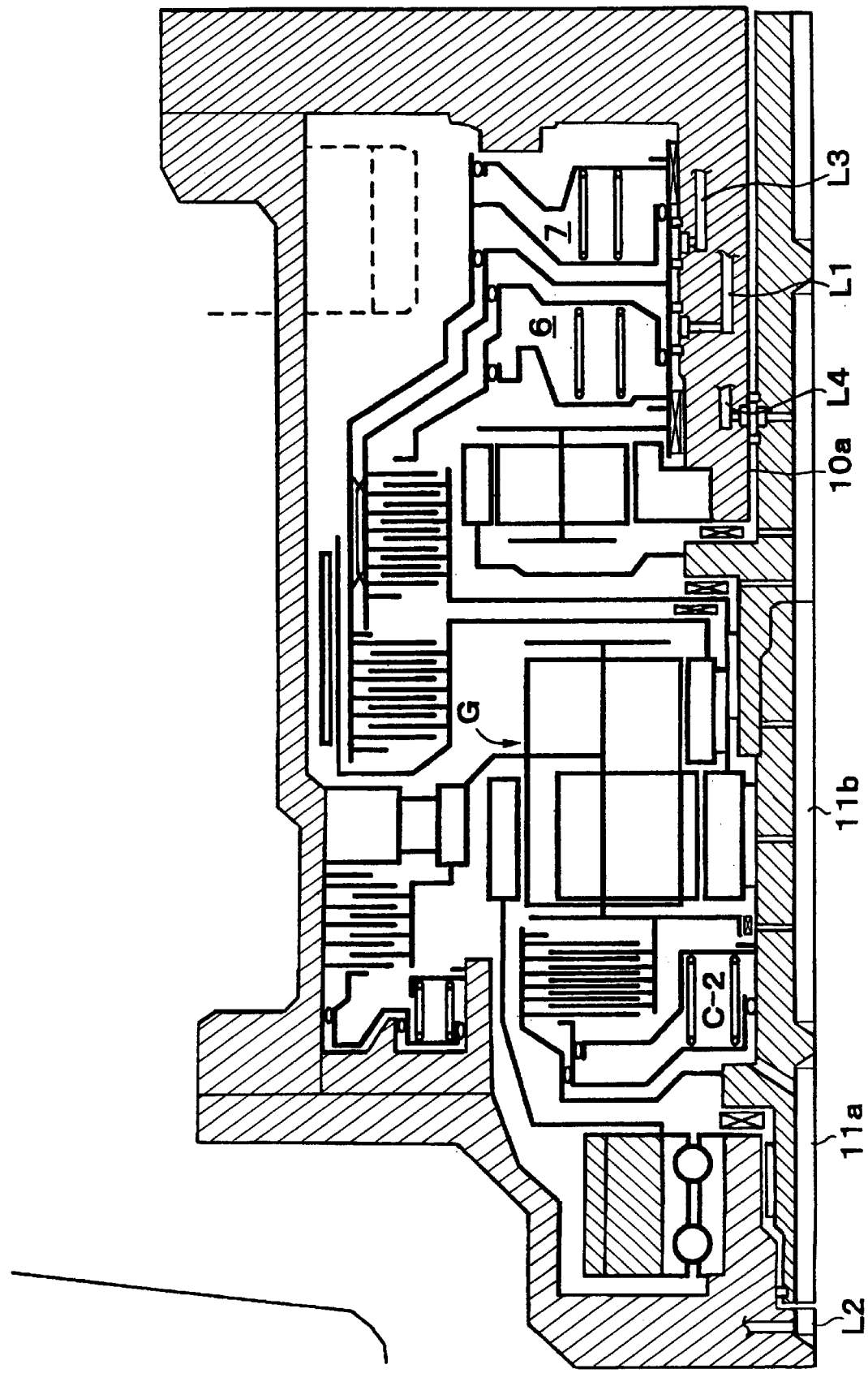
FIG. 14 is a cross sectional diagram simply illustrating a gear train of the sixth embodiment.

In the case of the transverse type structure, as with the relationship between the first embodiment and the second embodiment, the second clutch C-2 can be arranged at the rear side of the planetary gear set G, that is, in a far position from the reduction planetary gear G1. FIG. 14 illustrates the sixth embodiment having such a structure using a simplified cross sectional view. In this case, the planetary gear set G is moved to the front side because of the movement of the second clutch C-2 and the second clutch C-2 is arranged in the rear side space. The cylinder of the hydraulic servo 50 of the second clutch opens to the planetary gear set G side. The input shaft 11 is structured from a single shaft.

Also in this arrangement, the hydraulic paths L1, L3 for the hydraulic servos 6, 7 of the first and third clutches C1, C3 are formed in the front boss portion 10a. Therefore, the three hydraulic paths, which are the hydraulic paths L1, L3 and the lubrication hydraulic path L4, are formed in the boss portion 10a. As a result, the diameters of the seal rings are increased due to the increase in the diameter of the boss portion 10a. However, the number of seal rings for sealing the hydraulic paths is the same. Further, the hydraulic path L2, 11a for the hydraulic servo of the second clutch is sealed with a single seal ring 11e.

Figure 15:
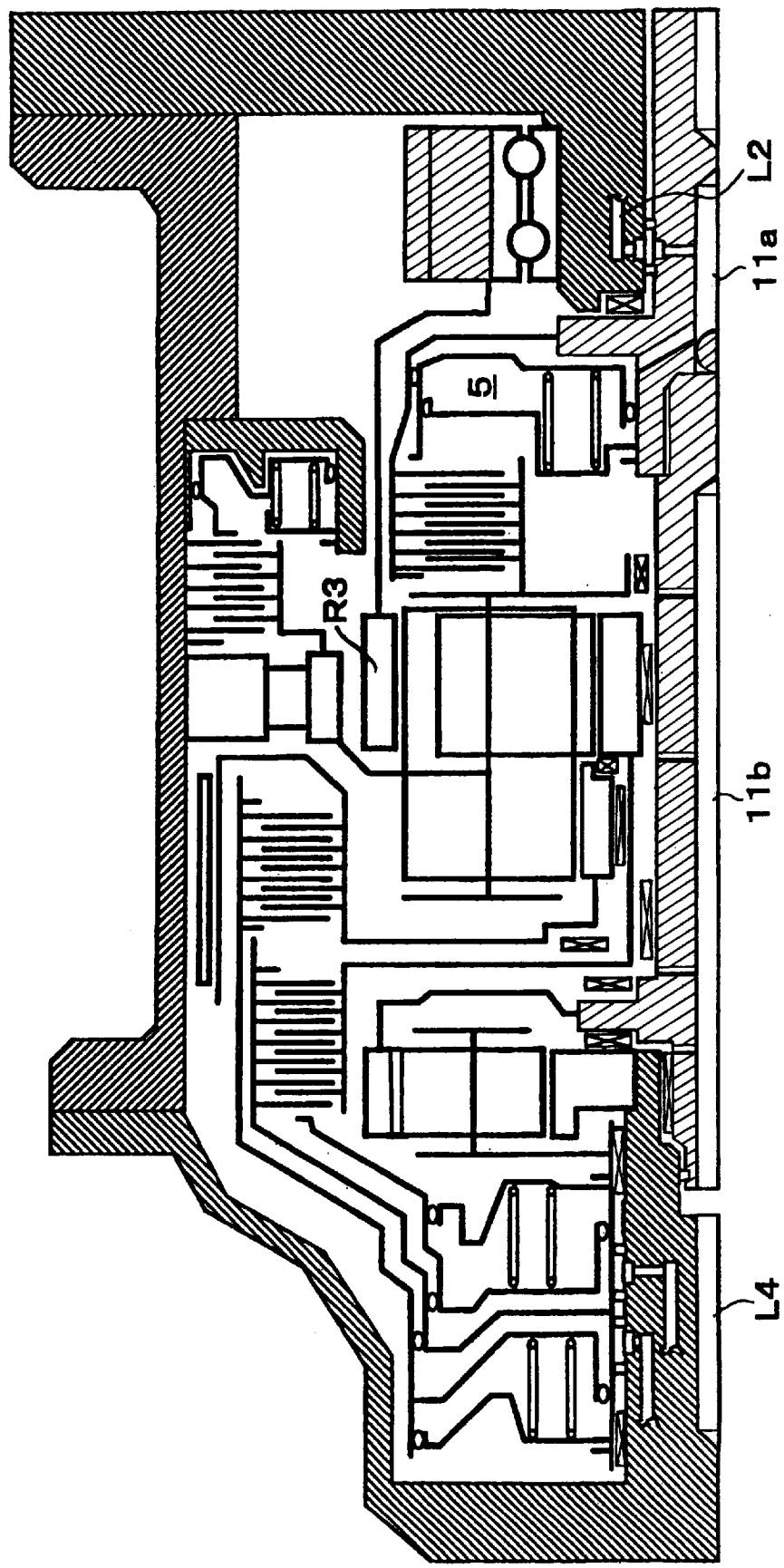
FIG. 15 is a cross sectional diagram simply illustrating a gear train of the seventh embodiment.

FIG. 15 illustrates the seventh embodiment. The difference between the seventh embodiment and the sixth embodiment is that all structures are reversed. In this case, the relationship between the hydraulic path L2, 11a for the hydraulic servo 5 of the second clutch and the lubrication hydraulic paths L4, 11b are reversed from the sixth embodiment.

Figure 16:
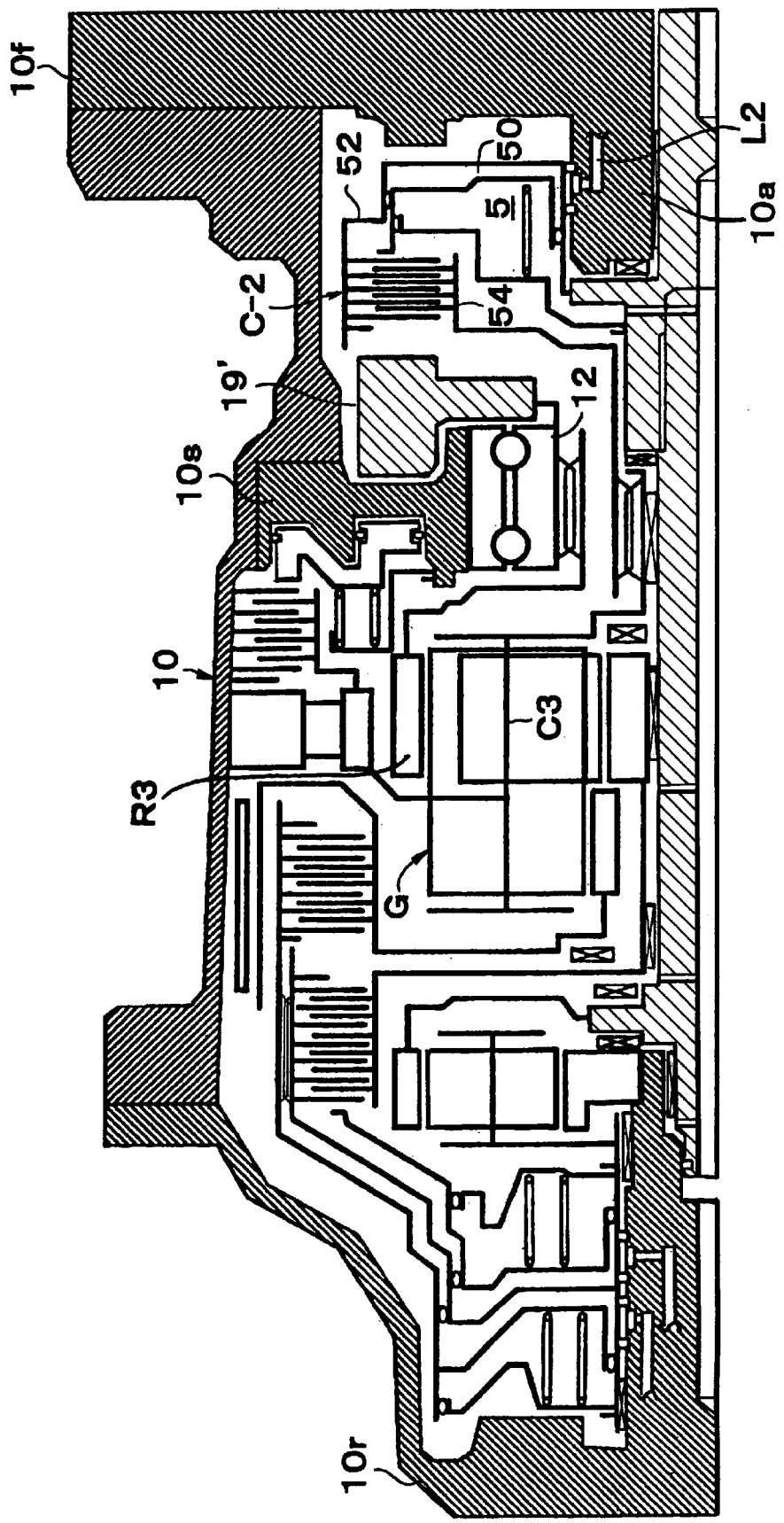
FIG. 16 is a cross sectional diagram simply illustrating a gear train of the eighth embodiment.

FIG. 16 illustrates the eighth embodiment. The difference between the eighth embodiment and the seventh embodiment is the positions of the second clutch C-2 and the counter drive gear 19' are exchanged. A largely different point from the other embodiments in this eighth embodiment is that the hydraulic servo 5 of the second clutch C-2 is non-rotatably connected to the flange of the input shaft 11 and arranged on the front boss portion 10a. That is, the inner portion of the drum 52 forming the cylinder 50 of the hydraulic servo 5 is arranged on the boss portion 10a so that the hydraulic pressure is directly applied to the cylinder 50 of the hydraulic servo 5 from the case hydraulic path L2 without passing through the input shaft 11.

Further, in the embodiment, the counter drive gear 19' is positioned in the intermediate portion of the shift mechanism. Therefore, a support 10s is arranged between the front end wall 10f and the rear end wall 10r of the transmission case 10. The counter drive gear 19' is supported, through a bearing 12, on the inner surface of the support 10s. The hub 54, as the output side member of the second clutch C-2, is connected with a spline engagement to the carrier C3 of the planetary gear set G at the radially inner side of the support 10s. Further, the ring gear R2 (R3), as the output element of the planetary gear set G, is connected with a spline engagement to the counter drive gear 19' at the radial inner side of the support 10s.

Figure 17:
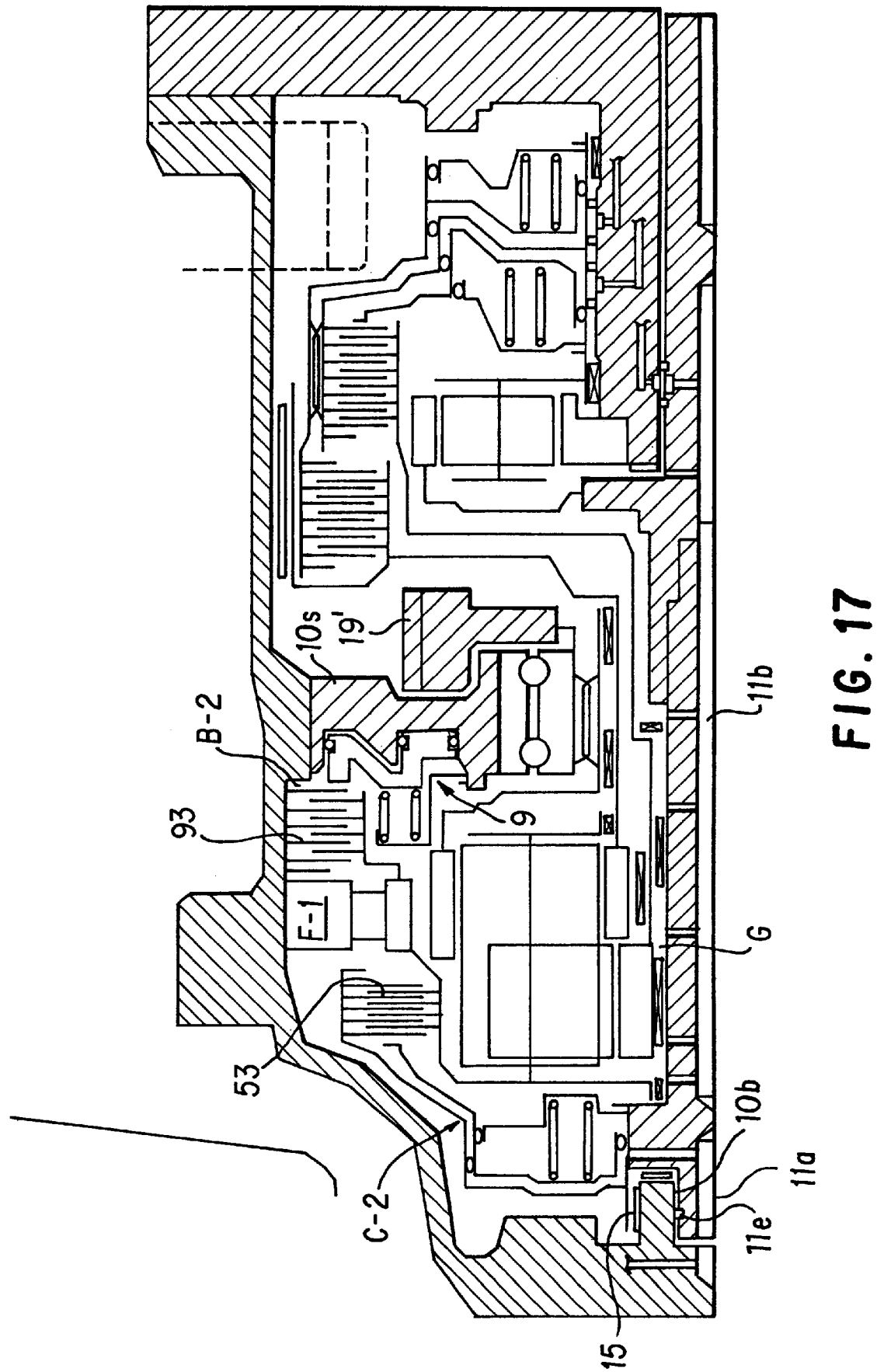
FIG. 17 is a cross sectional diagram simply illustrating a gear train of the ninth embodiment.

FIG. 17 illustrates the ninth embodiment. The difference between the ninth embodiment and the fifth embodiment, illustrated in FIG. 13, is the positions of the second clutch C-2 and the counter drive gear 19' are exchanged. In this case, the counter drive gear 19' is arranged in the middle portion of the shift mechanism and supported by the support 10s, also arranged in the middle portion of the shift mechanism. In this case the support 10s is used for the hydraulic servo of the second brake B-2 leading to compactness. Therefore, the order between the second brake B-2 and the one-way clutch F-1 are reversed, and the directions of the hydraulic servo 9 and the frictional member 93 are reversed. The frictional member 53 of the second clutch C-2 is arranged in a space, which is created by the change, at the radial outer side of the planetary gear set G so that the increase in the axial size because of the arrangement of the support 10s is counterbalanced.

In the embodiment, the hydraulic servo 5 of the second clutch C-2 is arranged in the hindmost position of the shift mechanism. The seal ring 11e is arranged in the radial inner side of a bearing 15 supporting the rear end portion of the input shaft 11 on the rear boss portion 10b of the transmission case 10. By the arrangement of the hydraulic servo 5 of the second clutch C-2 in the hindmost position, the hydraulic path 11a, which is formed in the input shaft 11, for the hydraulic servo 5 of the second clutch C-2 has a length which does not affect the lubrication hydraulic path 11b. Therefore, enough length of the lubrication hydraulic path 11b in the input shaft is maintained so that the each portion of the shift mechanism is evenly lubricated.

Figure 18:
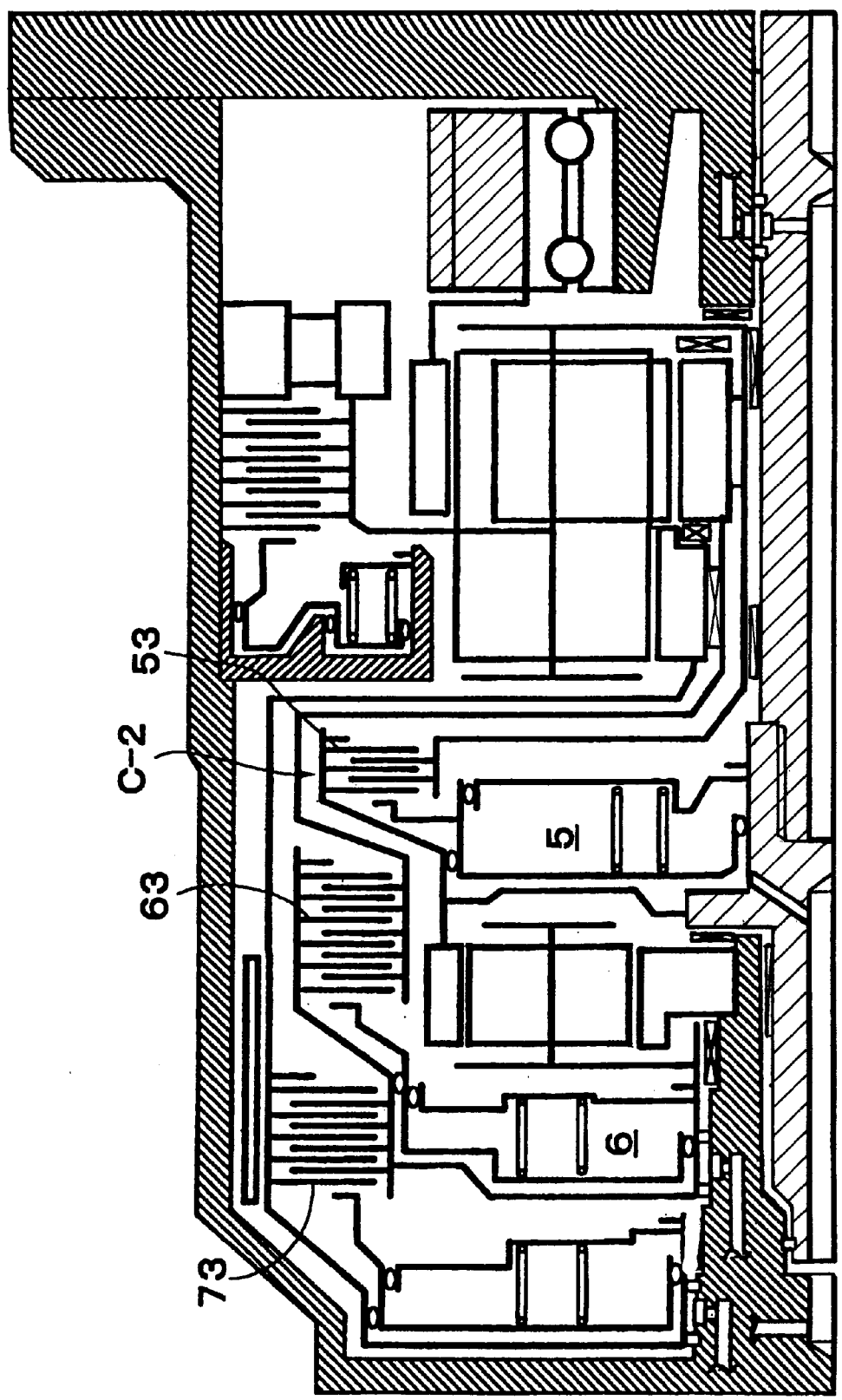
FIG. 18 is a cross sectional diagram simply illustrating a gear train of the tenth embodiment.

FIG. 18 illustrates the tenth embodiment which is basically same at the fourth embodiment using the third clutches arrangement. However, the connecting relationship between the first and third clutches C-1, C-3 is exchanged with the first clutches arrangement used in the first embodiment. In the tenth embodiment, to further reduce the axial size of the transmission, the frictional members 63, 73 of the first and third clutches C-1, C-3 are moved to the radial outer side of the hydraulic servo 6, the diameter of the frictional member 53 of the second clutch C-2 is increased, the number of structural elements of the frictional member 53 is reduced and the frictional member 53 is arranged at the radial outer side of the hydraulic servo 5. Therefore, the axial size of the transmission is further reduced. The application of each hydraulic pressure in this embodiment is the same as the fourth embodiment.

Figure 19:
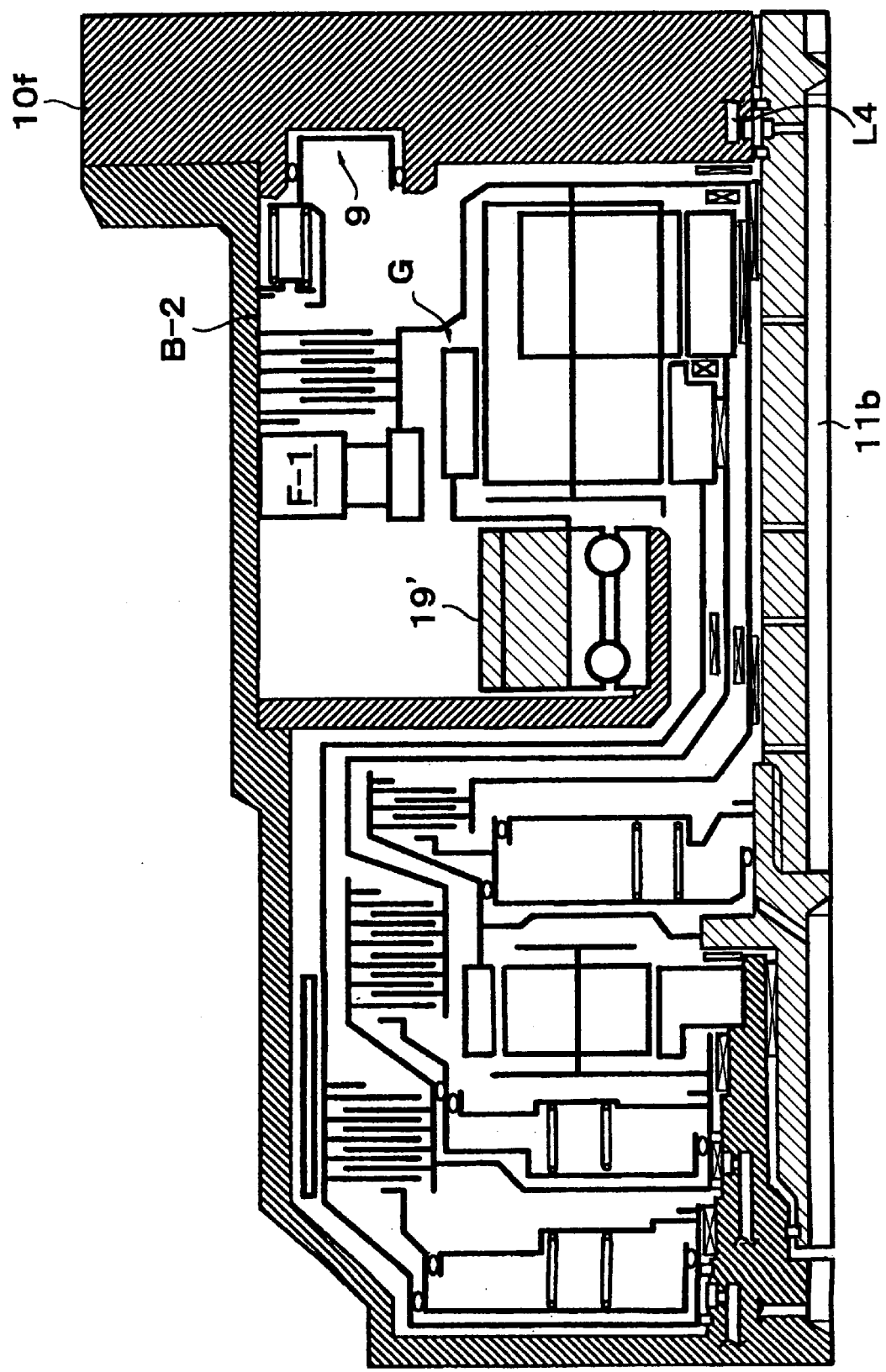
FIG. 19 is a cross sectional diagram simply illustrating a gear train of the eleventh embodiment.

FIG. 19 illustrates the eleventh embodiment. The difference between the eleventh embodiment and the tenth embodiment is the position of the counter drive gear 19' is moved to the middle portion of the shift mechanism. In the embodiment, the planetary gear set G is arranged in the mostly front portion of the shift mechanism. Therefore, the front boss portion is eliminated, and the hydraulic pressure is directly applied to the lubrication hydraulic path 11b from the case hydraulic path L4 formed in the front end wall 10f. Further, the directions of the second brake B-2 and the one-way clutch F-1 are reversed, and the hydraulic servo 9 of the brake B-2 is built into the front end wall 10f.

Figure 20:
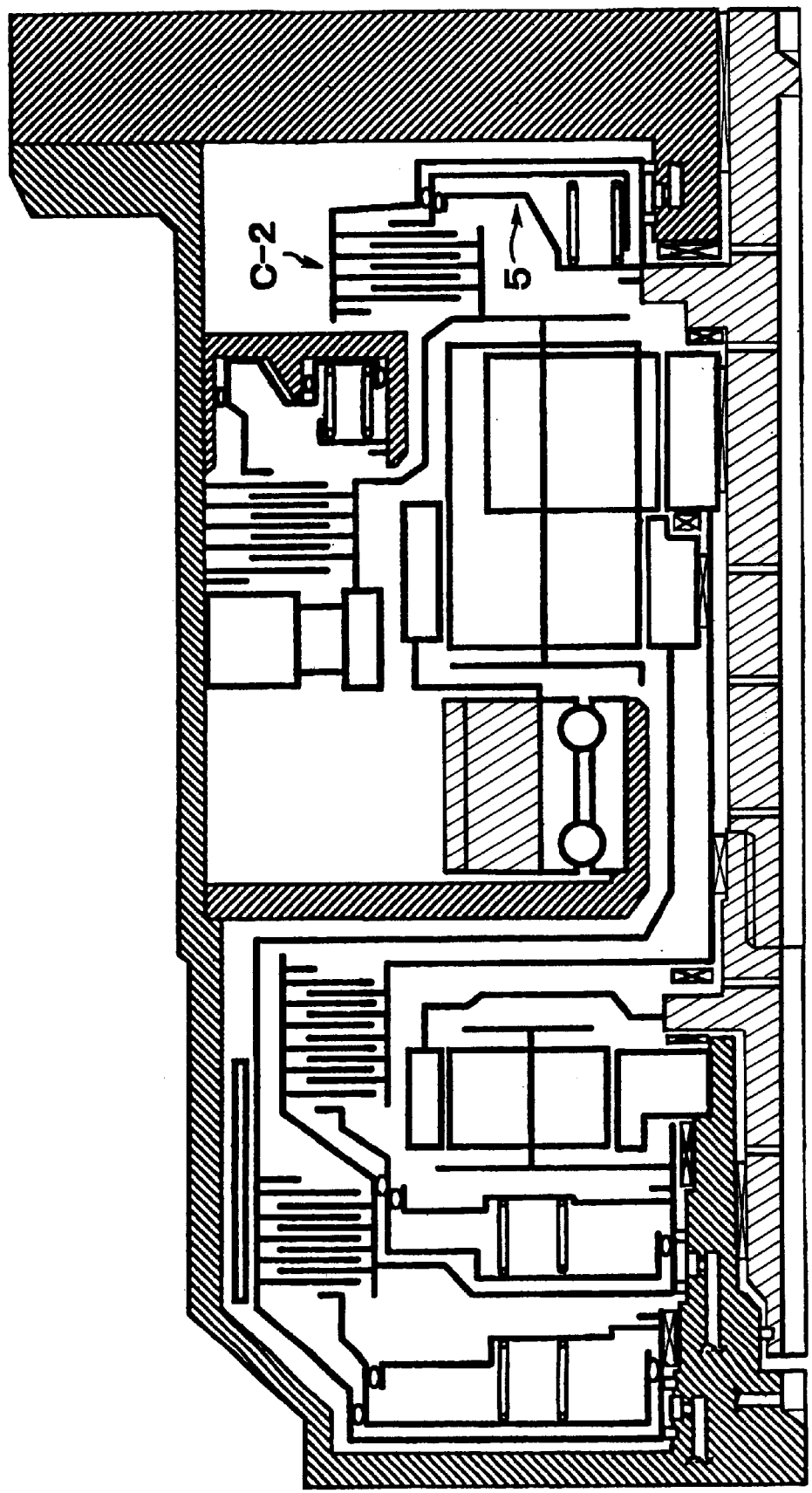
FIG. 20 is a cross sectional diagram simply illustrating a gear train of the twelfth embodiment.

FIG. 20 illustrates the twelfth embodiment. The difference between the twelfth embodiment and the eleventh embodiment is the second clutch C-2 is moved to the front side. In this embodiment, the hydraulic servo 5 of the second clutch C-2 is arranged in the same manner as the eighth embodiment illustrated in FIG. 16.

Figure 21:
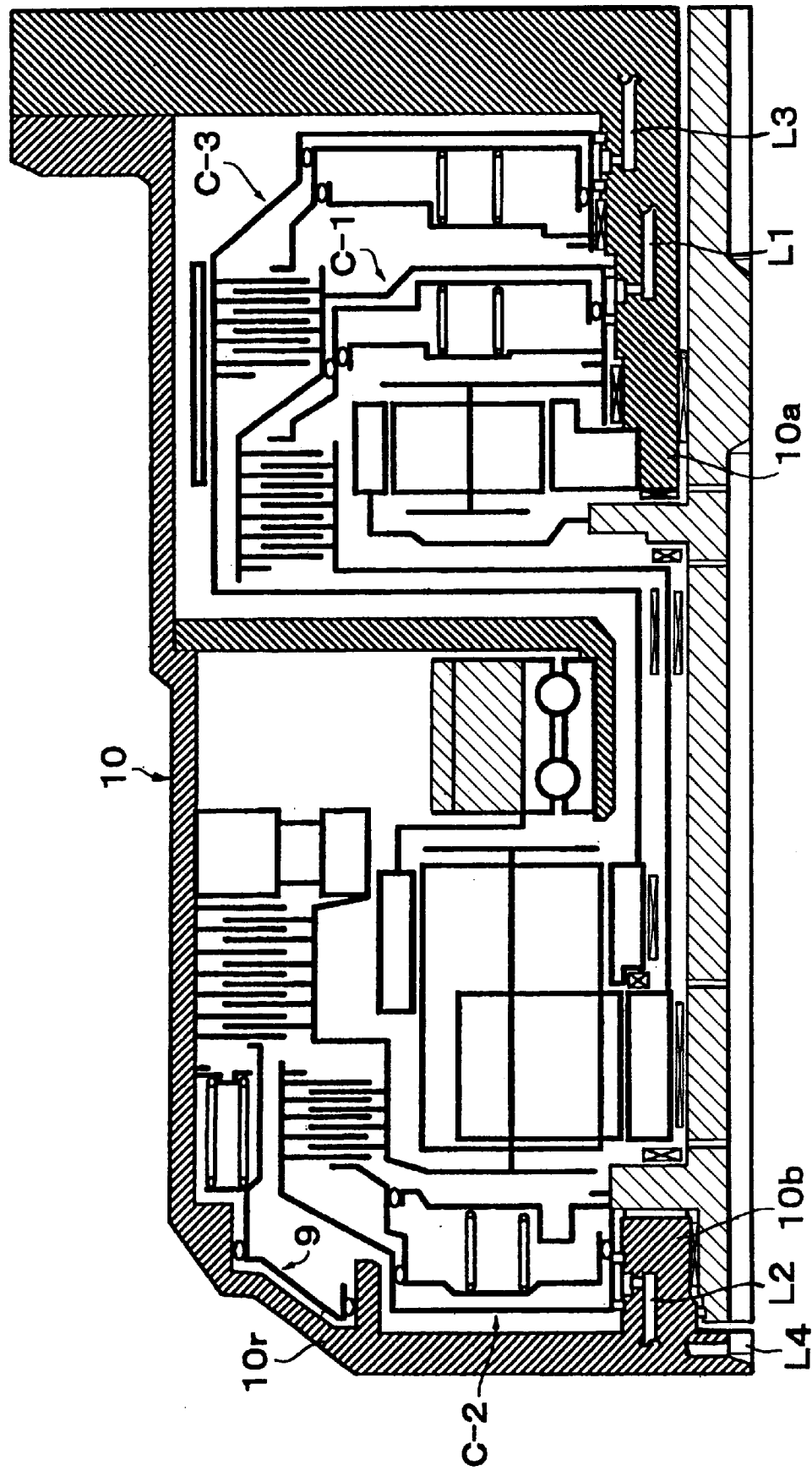
FIG. 21 is a cross sectional diagram simply illustrating a gear train of the thirteenth embodiment.

FIG. 21 illustrates the thirteenth embodiment. The difference between the thirteenth embodiment and the twelfth embodiment is all positions are reversed. In the embodiment, the hydraulic servo 9 of the second brake B-2 is built into the rear end wall portion 10r of the transmission case 10. In the embodiment, two hydraulic paths, which are the hydraulic paths L1, L3 for the hydraulic servos of the first and third clutches C-1, C-3, are formed in the front boss portion 10a, and two hydraulic paths, which are the hydraulic path for the hydraulic servo of the second clutch C-2 and the lubrication hydraulic path L4, are formed in the rear boss portion 10b. As a result, the hydraulic paths are deployed with a proper balance.

Figure 22:
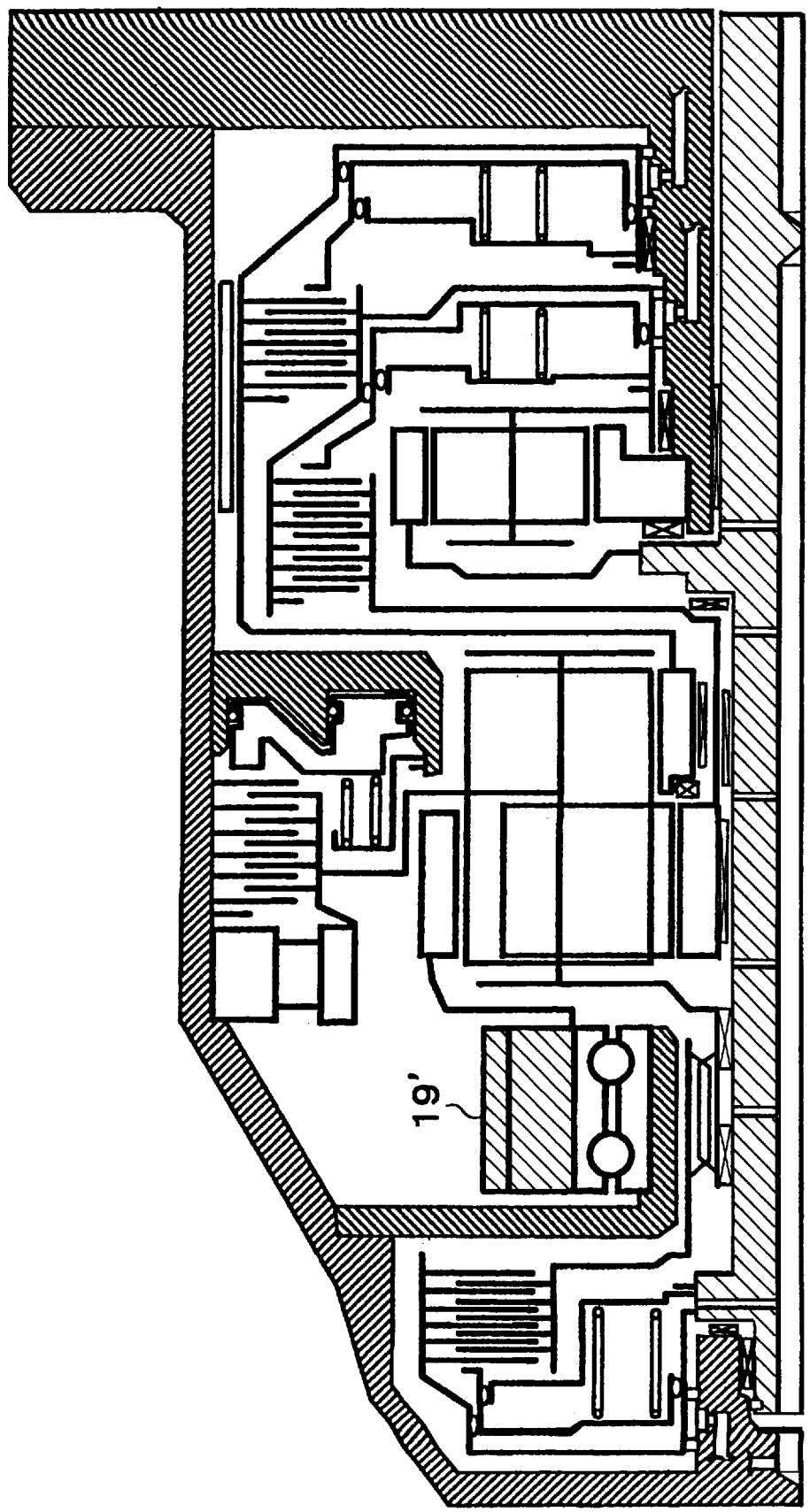
FIG. 22 is a cross sectional diagram simply illustrating a gear train of the fourteenth embodiment.

FIG. 22 illustrates the fourteenth embodiment. The difference between the fourteenth embodiment and the thirteenth embodiment is the counter drive gear 19' is moved to the rear side.

Figure 23:
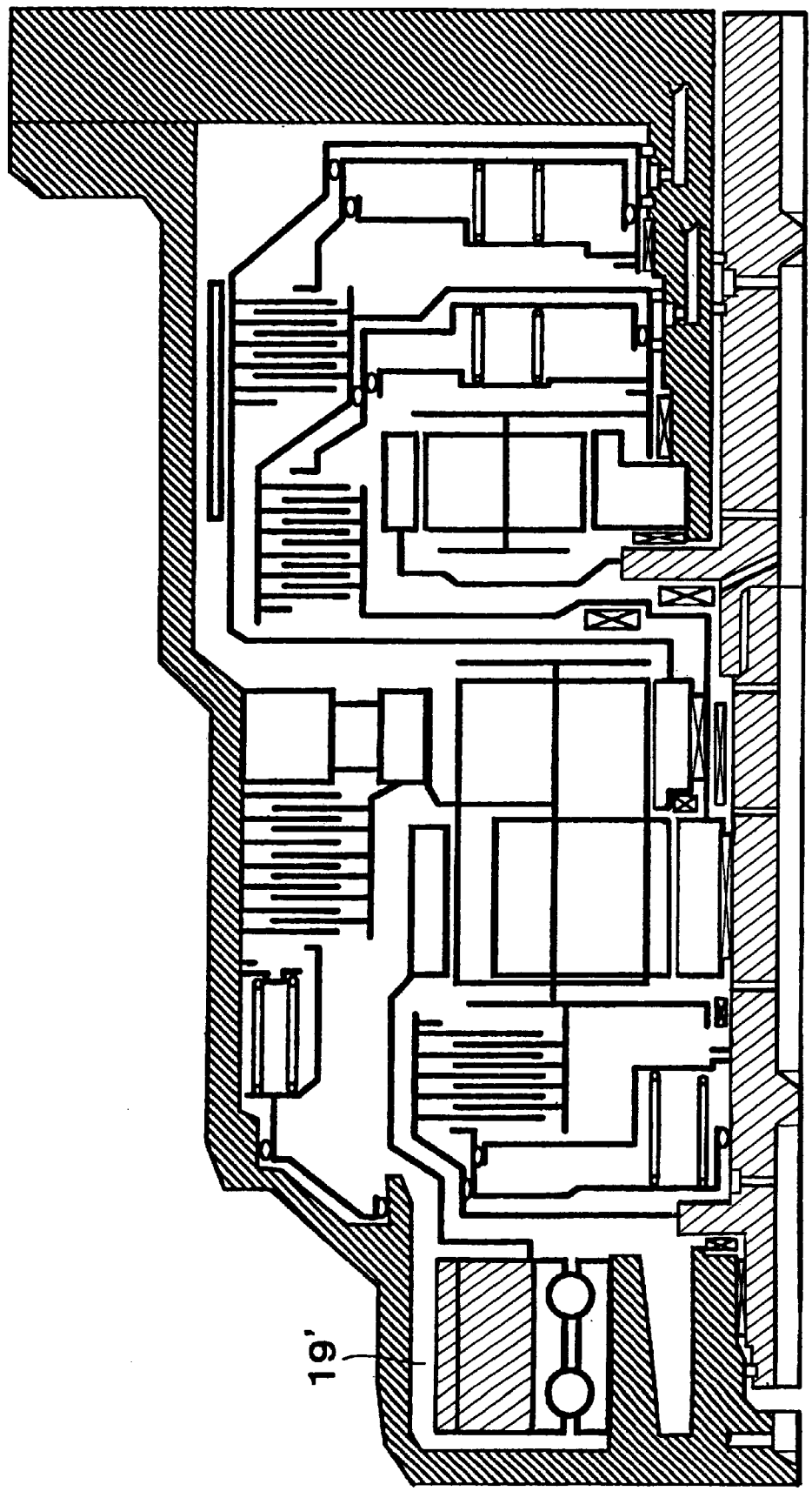
FIG. 23 is a cross sectional diagram simply illustrating a gear train of the fifteenth embodiment.

FIG. 23 illustrates the fifteenth embodiment. The difference between the fifteenth embodiment and the fourteenth embodiment is the counter drive gear 19' is moved further to the rear side, that is, the counter drive gear 19' is arranged in the hindmost portion of the shift mechanism.

Figure 24:
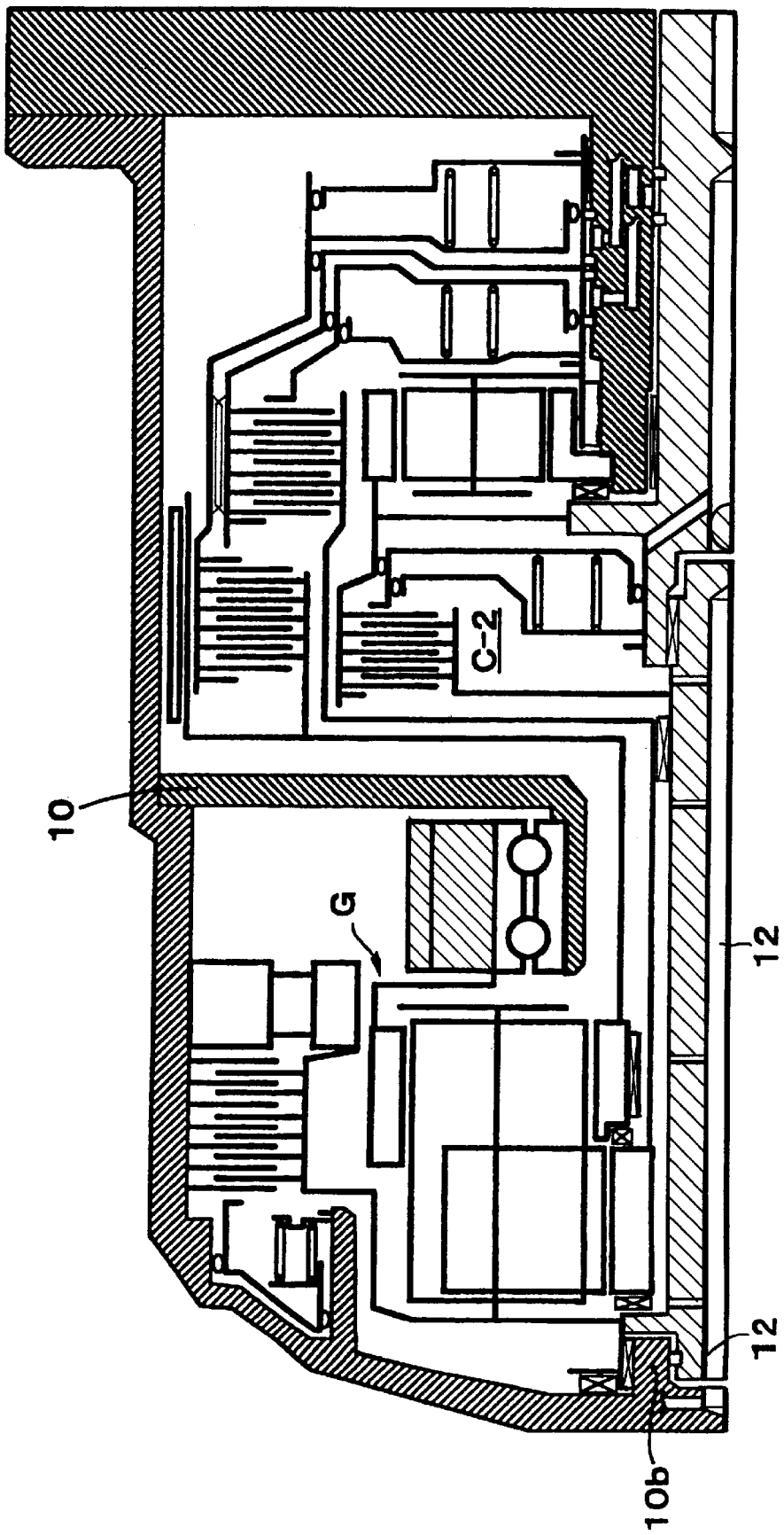
FIG. 24 is a cross sectional diagram simply illustrating a gear train of the sixteenth embodiment.

FIG. 24 illustrates the sixteenth embodiment. The difference between the sixteenth embodiment and the thirteenth embodiment, illustrated in FIG. 21, is the position of the second clutch C-2 is moved to the front side of the support 10s. In the embodiment, the planetary gear set G is positioned in the hindmost portion of the shift mechanism. Therefore, the boss portion 10b of the rear end wall portion 10r of the case is essentially not needed. However, a short boss portion 10b is retained for reducing the axial size by radially overlapping the bearing supporting the rear end side of the intermediate shaft 12 with the seal ring 12e arranged on the intermediate shaft 12.

As mentioned, the invention is exemplified with a ravegneaux type planetary gear set and described with embodiments in which the arrangements and connecting relationships of the structural members are changed. However, even if the ravegneaux type planetary gear set is exchanged with a combination of a simple planetary gear and a double planetary gear or a combination of double planetary gears, relatively proper gear ratio steps are achieved by development of the connecting relationships. In case the invention is applied to such a gear train, the same effects will be achieved. The invention should not be limited to the foregoing embodiments but can be modified in various ways based on its gist, and any modifications should not be excluded from the scope of the invention.

What is claimed is:

1. An automatic transmission for a vehicle automatically establishing multiple gear ratios by selectively inputting a plurality of input rotations to a planetary gear set, comprising:

a first clutch and a third clutch, which are connected through a reduction planetary gear to an input shaft and which input a decelerated rotation to the planetary gear set; and a second clutch which is directly connected to the input shaft and which inputs non-decelerated rotation to the planetary gear set, wherein one element of the reduction planetary gear is arranged and fixed on the end of a boss portion extended from a case wall of the transmission, the hydraulic servos of the first clutch and the third clutch are arranged on the boss portion, the hydraulic servo of the second clutch is arranged at the opposite side of the reduction planetary gear from the hydraulic servos of the first and third clutches, and hydraulic paths for applying hydraulic pressures to the hydraulic servos of the first and third clutches are formed in the boss portion.

2. The automatic transmission for a vehicle according to claim 1, wherein the hydraulic servo of the first clutch is closer to the reduction planetary gear than the hydraulic servo of the third clutch, a clutch drum of the first clutch is connected to an output element of the reduction planetary gear, a hub of the third clutch is connected through the clutch drum of the first clutch to an output element of the reduction planetary gear, and a clutch drum of the third clutch is connected to a shift element of the planetary gear set.

3. The automatic transmission for a vehicle according to claim 1, wherein the hydraulic servo of the first clutch is closer to the reduction planetary gear than the hydraulic servo of the third clutch, a clutch drum of the first clutch is connected to an output element of the reduction planetary gear, and a clutch drum of the third clutch is connected through the clutch drum of the first clutch to a output element of the reduction planetary gear.

4. The automatic transmission for a vehicle according to claim 3, wherein the cylinders of the hydraulic servos of the first and third clutches are common with each other, the hydraulic servos comprising a piston inserted in an inner side of the cylinder and the other piston covering an outer side, the hydraulic servos are arranged back to back so that operational directions of the pistons are opposite one another.

5. The automatic transmission for a vehicle according to claim 3, wherein the hydraulic servos of the first and third clutches are arranged in order that the cylinders open to the reduction planetary gear, a radial inner surface of the clutch drum of the third clutch is connected to the clutch drum of the first clutch, and a hub of the third clutch is extended in a radial outer space of the first clutch and connected to one of the shift elements of the planetary gear set.

6. The automatic transmission for a vehicle according to claim 1, wherein a clutch drum of the second clutch is non-rotatably connected to the input shaft, and a hydraulic path for applying a hydraulic pressure to the hydraulic servo of the second clutch comprises a hydraulic path formed in an other side case wall.

7. The automatic transmission for a vehicle according to claim 6, wherein an output shaft of the transmission is arranged in a rear portion of the case on a same axis as the input shaft, and the hydraulic path for the hydraulic servo of the second clutch comprises hydraulic paths formed in the input shaft and the output shaft and the hydraulic path formed in a rear end wall of the case.

8. The automatic transmission for a vehicle according to claim 7, wherein a hydraulic path for lubrication is formed in the input shaft, and the hydraulic path for lubrication is connected to a hydraulic path formed in the boss portion in which the hydraulic paths for the first and third clutches are also found.

9. The automatic transmission for a vehicle according to claim 6, wherein the hydraulic servo of the second clutch is arranged on the other boss portion extended from the other case wall, and the hydraulic path for the hydraulic servo of the second clutch comprises a hydraulic path formed in the other boss portion.

10. The automatic transmission for a vehicle according to claim 9, wherein a hydraulic path for lubrication is formed in the input shaft, and the hydraulic path for lubrication is connected to a hydraulic path formed in the other case wall.

11. The automatic transmission for a vehicle according to claim 9, wherein the hydraulic path for the second clutch is formed by connecting the hydraulic path formed in the case wall to the hydraulic path formed in the input shaft and opened at the rear end portion of the input shaft, and a clearance between the input shaft and the case wall surrounding the input shaft is sealed with one seal ring.

12. The automatic transmission for a vehicle according to claim 1, wherein the second clutch is arranged nearby the reduction planetary gear, a clutch drum is relatively non-rotatably connected to the input shaft, and a hydraulic path for applying a hydraulic path to a hydraulic servo of the second clutch comprises a hydraulic path formed in the input shaft and a hydraulic path formed in the boss portion.

13. The automatic transmission for a vehicle according to claim 12, wherein a clutch drum of the second clutch is common with an input member inputting a rotation to the reduction planetary gear.

14. The automatic transmission for a vehicle according to claim 13, wherein a hydraulic path for lubrication is formed in the input shaft, and the hydraulic path for lubrication is connected to a hydraulic path formed in a case wall which is arranged in the other side from the case wall extending the boss portion having the hydraulic paths for the first and third clutches.

15. The automatic transmission for a vehicle according to claim 13, wherein the hydraulic path for the second clutch is formed by connecting the hydraulic path formed in the case wall to the hydraulic path formed in the input shaft and opened at the rear end portion of the input shaft, and a clearance between the input shaft and the case wall surrounding the input shaft is sealed with one seal ring.

16. The automatic transmission for a vehicle according to claim 1, wherein the planetary gear set comprises first through fourth shift elements, the first shift element is connected to an output side member of the first clutch, the second shift element is connected to an output side member of the third clutch and can be engaged with a transmission case by a first engaging means, the third shift element is connected an output side member of the second clutch and can be engaged with the transmission case by a second engaging means, and the fourth shift element is connected to an output member.

17. The automatic transmission for a vehicle according to claim 16, wherein the hydraulic servo of the first clutch is closer to the reduction planetary gear than the hydraulic servo of the third clutch, a clutch drum of the first clutch is connected to an output element of the reduction planetary gear, a hub of the third clutch is connected through the clutch drum of the first clutch to the output element of the reduction planetary gear, and a clutch drum of the third clutch is connected to a shift element of the planetary gear set.

18. The automatic transmission for a vehicle according to claim 16, wherein the hydraulic servo of the first clutch is closer to the reduction planetary gear than the hydraulic servo of the third clutch, the clutch drum of the first clutch is connected to an output element of the reduction planetary gear, and the clutch drum of the third clutch is connected through the clutch drum of the first clutch to the output element of the reduction planetary gear.

19. The automatic transmission for a vehicle according to claim 18, wherein the cylinders of the hydraulic servos of the first and third clutches are common with each other, each hydraulic servo comprises a piston inserted in the inner side of the cylinder and another piston covering the outer side, the hydraulic servos are arranged back to back so that the operational directions of the pistons are opposite to one another.

20. The automatic transmission for a vehicle according to claim 18, wherein the hydraulic servos of the first and third clutches are arranged in order that the cylinders open to the reduction planetary gear, the radial inner surface of the clutch drum of the third clutch is connected to the clutch drum of the first clutch, and the hub of the third clutch is extended in the radial outer space of the first clutch and connected to one of the shift elements of the planetary gear set.

* * * * *